United States Patent
Kim et al.

(10) Patent No.: US 11,521,046 B2
(45) Date of Patent: Dec. 6, 2022

(54) TIME-DELAYED CONVOLUTIONS FOR NEURAL NETWORK DEVICE AND METHOD

(71) Applicants: Samsung Electronics Co., Ltd., Suwon-si (KR); Postech Academy-Industry Foundation, Pohang-si (KR)

(72) Inventors: Sungho Kim, Yongin-si (KR); Jinseok Kim, Incheon (KR); Yulhwa Kim, Daegu (KR); Jaejoon Kim, Pohang-si (KR); Dusik Park, Suwon-si (KR); Hyungjun Kim, Pohang-si (KR)

(73) Assignees: Samsung Electronics Co., Ltd., Suwon-si (KR); POSTECH ACADEMY-INDUSTRY FOUNDATION, Pohang-si (KR)

( * ) Notice: Subject to any disclaimer, the term of this patent is extended or adjusted under 35 U.S.C. 154(b) by 895 days.

(21) Appl. No.: 16/170,081

(22) Filed: Oct. 25, 2018

(65) Prior Publication Data
US 2019/0138892 A1    May 9, 2019

Related U.S. Application Data

(60) Provisional application No. 62/583,116, filed on Nov. 8, 2017, provisional application No. 62/583,171, filed on Nov. 8, 2017.

(30) Foreign Application Priority Data

Jan. 15, 2018  (KR) .................. 10-2018-0005250

(51) Int. Cl.
 *G06N 3/063*  (2006.01)
 *G06N 3/04*   (2006.01)

(52) U.S. Cl.
 CPC ............. *G06N 3/063* (2013.01); *G06N 3/049* (2013.01)

(58) Field of Classification Search
 CPC .... G06N 3/0454; G06N 3/0481; G06N 3/049; G06N 3/063; G06N 3/04
 See application file for complete search history.

(56) References Cited

U.S. PATENT DOCUMENTS

| 10,460,230 B2 | 10/2019 | Brothers et al. |
| 2012/0023051 A1 | 1/2012 | Pishehvar et al. |

(Continued)

FOREIGN PATENT DOCUMENTS

| CN | 106503742 A | 3/2017 |
| CN | 107103113 A | 8/2017 |
| KR | 10-2016-0143548 A | 12/2016 |

OTHER PUBLICATIONS

Misra et al., "Shuffle and Learn: Unsupervised Learning Using Temporal Order Verification", Sep. 17, 2016, European Conference on Computer Vision ECCV 2016: Computer Vision—ECCV 2016, pp. 527-544 (Year: 2016).*

(Continued)

*Primary Examiner* — Brent Johnston Hoover
(74) *Attorney, Agent, or Firm* — NSIP Law

(57) ABSTRACT

A method of performing operations on a plurality of inputs and a same kernel using a delay time by using a same processor, and a neural network device thereof are provided, the neural network device includes input data including a first input and a second input, and a processor configured to obtain a first result by performing operations between the first input and a plurality of kernels, to obtain a second result by performing operations between the second input, which is received at a time delayed by a first interval from a time when the first input is received, and the plurality of kernels, and to obtain output data using the first result and the second (Continued)

result. The neural network device may include neuromorphic hardware and may perform convolutional neural network (CNN) mapping.

20 Claims, 19 Drawing Sheets

(56) References Cited

U.S. PATENT DOCUMENTS

| | | | |
|---|---|---|---|
| 2013/0031040 | A1 | 1/2013 | Modha |
| 2015/0262055 | A1 | 9/2015 | Akopyan et al. |
| 2015/0339570 | A1 | 11/2015 | Scheffler |
| 2016/0379137 | A1 | 12/2016 | Burger et al. |
| 2017/0169326 | A1 | 6/2017 | Diamos et al. |
| 2018/0173571 | A1* | 6/2018 | Huang .............. G06N 3/063 |
| 2018/0189215 | A1* | 7/2018 | Boesch ............ G06F 30/327 |
| 2018/0373981 | A1* | 12/2018 | Hu .................... G06N 3/063 |
| 2021/0224632 | A1* | 7/2021 | Zhou ................ G06F 16/285 |

OTHER PUBLICATIONS

"Martinel, Niki et al.," Evolution of Neural Learning Systems, *IEEE Systems, Man, and Cybernetics Magazine*, vol. 1, Issue: 3, Jul. 2015 (pp. 17-26).

Esser, Steven K. et al., "Convolutional Networks for Fast, Energy-Efficient Neuromorphic Computing", National Academy of Sciences, arXiv:1603.08270, May 24, 2016 (pp. 1-7).

Xia, Lixue et al., "Switched by Input: Power Efficient Structure for RRAM-based Convolutional Neural Network", 2016 53nd ACM/EDAC/IEEE Design Automation Conference (DAC), Jun. 5-9, 2016 (6 pages in English).

Shafiee, Ali et al., "ISAAC: A Convolutional Neural Network Accelerator with In-Situ Analog Arithmetic in Crossbars", *2016 ACM/IEEE 43rd Annual International Symposium on Computer Architecture (ISCA)*, Jun. 18-22, 2016 (pp. 14-26).

Tang, Tianqi et al., "Binary Convolutional Neural Network on RRAM", *2017 22nd Asia and South Pacific Design Automation Conference (ASP-DAC)*, Jan. 16-19, 2017 (pp. 782-787).

Kim, Yulhwa et al., "Input-Splitting of Large Neural Networks for Power-Efficient Accelerator with Resistive Crossbar Memory Array", ISLPED '18 Proceedings of the International Symposium on Low Power Electronics and Design, Article No. 41, Seattle, WA, USA, Jul. 23-25, 2018 (6 pages in English).

Kim, Jinseok et al., "Compact Convolution Mapping on Neuromorphic Hardware using Axonal Delay", *ISLPED '18 Proceedings of the International Symposium on Low Power Electronics and Design Article No. 3*, Seattle, WA, USA, Jul. 23-25, 2018 (6 pages in English).

\* cited by examiner $$Y_k = \sum_{i=1}^{n} W_{ik} * X_i$$

$$\begin{bmatrix} X_1 \\ X_2 \\ \vdots \\ X_n \end{bmatrix}^T \begin{bmatrix} W_{11} & W_{12} & \cdots & W_{1m} \\ W_{21} & W_{22} & \cdots & W_{2m} \\ \vdots & \vdots & \ddots & \vdots \\ W_{n1} & W_{n2} & \cdots & W_{nm} \end{bmatrix}$$

$$= \begin{bmatrix} Y_1 & Y_2 & \cdots & Y_m \end{bmatrix}$$

1610, 1611, 1612

$$I_k = \sum_{i=1}^{n} G_{ik} * V_i$$

TIME-DELAYED CONVOLUTIONS FOR NEURAL NETWORK DEVICE AND METHOD

CROSS-REFERENCE TO RELATED APPLICATION(S)

This application claims the benefit of U.S. Ser. Nos. 62/583,116 and 62/583,171, filed on Nov. 8, 2017, in the U.S. Patent and Trademark Office, and Korean Patent Application No. 10-2018-0005250, filed on Jan. 15, 2018, in the Korean Intellectual Property Office, the entire disclosures of which are incorporated herein by reference for all purposes.

BACKGROUND

1. Field

The following description relates to neural network devices and methods of operating the same.

2. Description of Related Art

As neural network technology develops, research has been actively conducted on analyzing input data and extracting information using a neural network device in a variety of electronic systems. For an apparatus, which is implemented to operate at lower power consumption and low performance, to analyze a large amount of input data in real time and to extract targeted information using a neural network, a technique for efficiently processing operations of the neural network is desirable.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a neural network device including input data comprising a first input and a second input a processor configured to obtain a first result by performing operations between the first input and a plurality of kernels, obtain a second result by performing operations between the second input, which is received at a time delayed by a first interval from a time when the first input is received, and the plurality of kernels, and obtain output data using the first result and the second result.

The neural network device may include neuromorphic hardware configured to perform convolution neural network (CNN) mapping using the first input and the second input.

The neural network device may include a memory storing instructions that, when executed by the processor, may cause the processor to drive a neural network by executing the instructions and performing an operation on the input data.

The neuromorphic hardware may include a plurality of cores, each of the cores comprise variable resistive devices configured to switch between different resistance states based on a voltage or a current applied to both ends of the variable resistive device.

A conductivity of the variable resistive devices may change, in response to a voltage greater than a threshold being applied to the both ends of the variable resistive device.

The plurality of kernels may be stored in the variable resistive devices of the plurality of cores.

The input data may include image data, and wherein the first input may include data with respect to a first region of the image data and the second input may include data with respect to a second region of the image data.

The first region and the second region may partially overlap and are adjacent to each other.

The processor may be configured to obtain the second result by performing operations between the second input and the plurality of kernels, in response to the second input being a valid input.

The processor may be configured to determine that the second input is the valid input, in response to the second input being pixel data constituting the second region.

The processor may be configured to receive data streams having different delay times and representing image data from input terminals, to receive the first input from the data streams received from the input terminals, and to receive the second input from the data streams received from the input terminals.

The first input may be received during a first cycle, and wherein the second input may be received during a second cycle delayed by the first interval from the first cycle.

The processor may be configured to obtain the first result by adding operation results between the first input and the plurality of kernels, and to obtain the second result by adding operation results between the second input and the plurality of kernels.

The processor may be configured to receive a third input included in the input data at a time delayed by a second interval from a time when the second input is received, to obtain a third result by performing operations between the third input and the plurality of kernels, and to obtain the output data by using the first result, the second result, and the third result.

In another general aspect, there is provided a method, performed by a neural network device, of performing an operation on input data including a first input and a second input, the method including obtaining a first result by performing operations between the first input and a plurality of kernels using a processor in the neural network device, obtaining a second result by performing operations between the second input received at a time delayed by a first interval from a time when the first input is received and the plurality of kernels using the processor, and obtaining output data using the first result and the second result.

The neural network device may include neuromorphic hardware configured to perform convolution neural network (CNN) mapping using the first input and the second input.

The input data may include image data, and wherein the first input may include data with respect to a first region of the image data and the second input may include data with respect to a second region of the image data.

The first region and the second region may partially overlap and may be adjacent to each other.

The obtaining of the second result may include obtaining the second result by performing operations between the second input and the plurality of kernels, in response to determining that the second input is a valid input.

The determining of whether the second input is the valid input may include determining that the second input is the valid input, in response to the second input being pixel data constituting the second region.

The method may include receiving data streams having different delay times and representing image data from input terminals, wherein the first input may include data streams received from the input terminals, and wherein the second input may include data streams received from the input terminals.

The first input may be received during a first cycle, and wherein the second input may be received during a second cycle delayed by the first interval from the first cycle.

The obtaining of the first result may include obtaining the first result by adding operation results between the first input and the plurality of kernels, and wherein the obtaining of the second result may include obtaining the second result by adding operation results between the second input and the plurality of kernels.

The method may include receiving a third input included in the input data at a time delayed by a second interval from a time when the second input is received by using the processor, and obtaining a third result by performing operations between the third input and the plurality of kernels, wherein the obtaining of the output data may include obtaining the output data using the first result, the second result, and the third result.

In another general aspect, there is provided an electronic device, including input terminals configured to sense image data comprising a first input and a second input delayed by a time interval from when the first input is sensed, a memory configured to store kernels and instructions, and a processor configured to execute the instructions to obtain a first result by operating between the first input and the kernels, obtain a second result by operating between the second input and the kernels, and obtain output data using the first result and the second result.

Other features and aspects will be apparent from the following detailed description, the drawings, and the claims.

Figure 1:
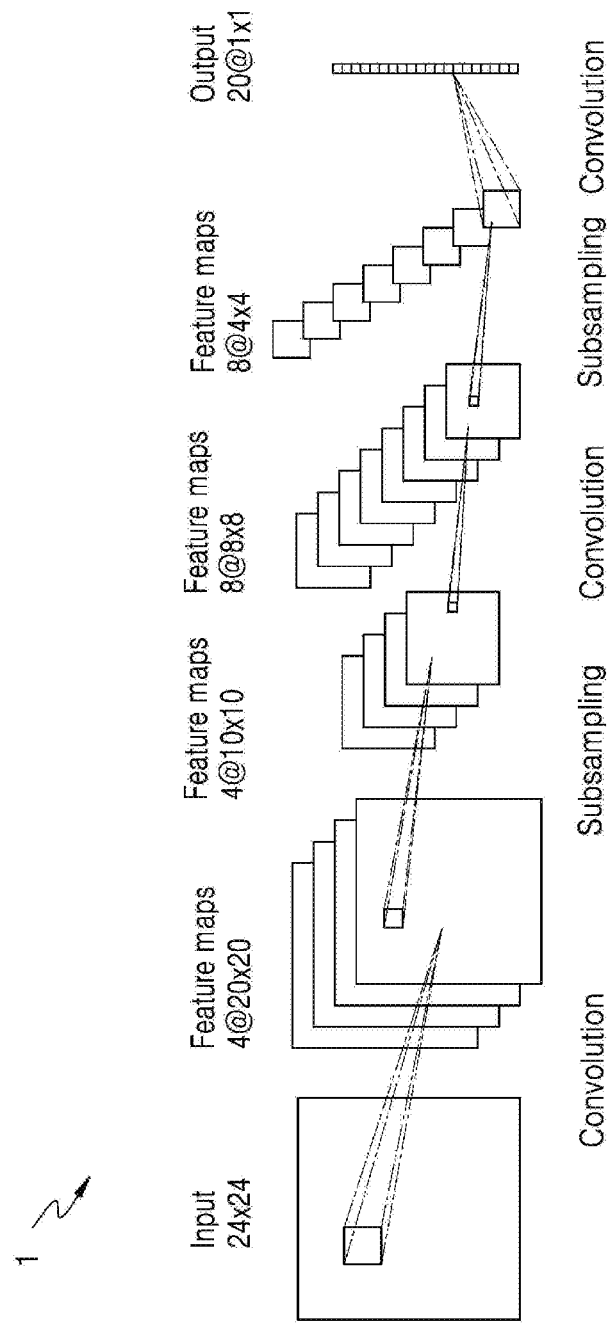
FIG. 1 is a diagram for illustrating an example of an architecture of a neural network.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

When a part is connected to another part, it includes not only a case where the part is directly connected but also a case where the part is connected with another part in between. Also, when a part includes a constituent element, other elements may also be included in the part, instead of the other elements being excluded, unless specifically stated otherwise. Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The use of the term 'may' herein with respect to an example or embodiment, e.g., as to what an example or embodiment may include or implement, means that at least one example or embodiment exists where such a feature is included or implemented while all examples and embodiments are not limited thereto.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects.

FIG. 1 is a diagram illustrating an example for describing an architecture of a neural network 1.

Referring to FIG. 1, the neural network 1 may have an architecture of a deep neural network (DNN) or an architecture of an n-layer neural network. The DNN or the n-layer neural network may correspond to a convolutional neural network (CNN), a recurrent neural network (RNN), a deep belief network, a fully connected network, a bi-directional neural network, restricted Boltzman machines, or may include different or overlapping neural network portions respectively with full, convolutional, recurrent, and/or bi-directional connections. For example, the neural network 1 may be implemented as the CNN. However, the neural network 1 is not limited thereto. The CNN, which is the example of the neural network 1 illustrated in FIG. 1, may include a sub-sampling layer, a pooling layer, a fully connected layer, etc., in addition to a convolution layer.

The neural network 1 may be implemented as an architecture having a plurality of layers including an input image, feature maps, and an output. In the neural network 1, a convolution operation between the input image, and a filter referred to as a kernel, is performed, and as a result of the convolution operation, the feature maps are output. Here, the feature maps that are output are input feature maps, and a convolution operation between the output feature maps and the kernel is performed again, and as a result, new feature maps are output. Based on such repeatedly performed convolution operations, results of recognition of characteristics of the input image via the neural network 1 may be output.

In another example, the neural network 1 may include an input source sentence (e.g., voice entry) instead of an input image. In such an example, a convolution operation is performed on the input source sentence with a kernel, and as a result, the feature maps are output. The convolution operation is performed again on the output feature maps as input feature maps, with a kernel, and new feature maps are output. When the convolution operation is repeatedly performed as such, a recognition result with respect to features of the input source sentence may be finally output through the neural network 1.

For example, when an image having a size of 24×24 pixels is input in the neural network 1 of FIG. 1, the input image may be output as feature maps of 4 channels having a 20×20 size via a convolution operation between the input image and the kernel. The size of the feature maps having the 20×20 size may be decreased via repeated convolution operations between the feature maps and the kernel. Thus, characteristics of a 1×1 size may be output. In the neural network 1, a convolution operation and sub-sampling (or pooling) may be repeatedly performed in a plurality of layers, and thus, robust characteristics, which may represent a general image, may be filtered from the image and may be output. Also, the output ultimate characteristics may be input in the fully connected layer so as to ultimately derive a recognition result of the input image.

Figure 2:
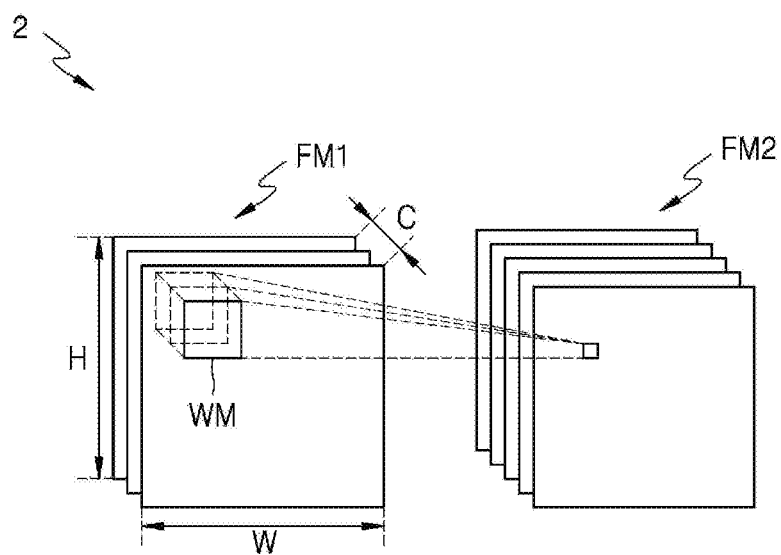
FIG. 2 is a diagram illustrating an example of a relationship between an input feature map and an output feature map in a neural network.

FIG. 2 is a diagram illustrating an example of a relationship between an input feature map and an output feature map in the neural network 1.

Referring to FIG. 2, in a layer 2 in the neural network 1, a first feature map FM1 may correspond to the input feature map, and a second feature map FM2 may correspond to the output feature map. In an example, a feature map denotes a set of data representing various characteristics of input data. The first and second feature maps FM1 and FM2 may have elements of a two-dimensional matrix or elements of a three-dimensional matrix, and pixel values may be defined in each of the elements of the two-dimensional matrix and the elements of the three-dimensional matrix. The first and second feature maps FM1 and FM2 may have a width W (also referred to as a column), a height H (also referred to as a row), and a depth C. here, the depth C may correspond to the number of channels.

A convolution operation between the first feature map FM1 and a weight map WM of a kernel may be performed, and as a result, the second feature map FM2 may be generated. The weight map WM is a weight defined in the elements of the two-dimensional matrix or the elements of the three-dimensional matrix, and when the convolution operation between the first feature map FM1 and the weight map WM is performed, characteristics of the first feature map FM1 may be filtered. The weight map WM shifts the first feature map FM1 based on a sliding window technique to perform a convolution operation between the kernel and windows (also referred to as tiles) of the first feature map FM1. During each shift, each of weights included in the weight map WM may be multiplied by or added to each of pixel values of the windows overlapping each other in the first feature map FM1. As the convolution operation between the first feature map FM1 and the weight map WM is performed, a channel of the second feature map FM2 may be generated. FIG. 1 illustrates the weight map WM with respect to one kernel. However, the convolution operation may be performed between a weight map of each of a plurality of kernels and the first feature map FM1, so that the second feature map having a plurality of channels may be generated.

The second feature map FM2 may correspond to an input feature map of a next layer. For example, the second feature map FM2 may be the input feature map of a pooling layer (or a sub-sampling layer).

FIGS. 1 and 2 illustrate only the schematic architecture of the neural network 1, for convenience of explanation. However, it would be understood that unlike the illustration of FIGS. 1 and 2, the neural network 1 may be implemented to have more or less layers, feature maps, kernels, etc. than the illustration of FIGS. 1 and 2, and sizes of the layers, the feature maps, the kernels, etc. may be modified in various ways.

Figure 3:
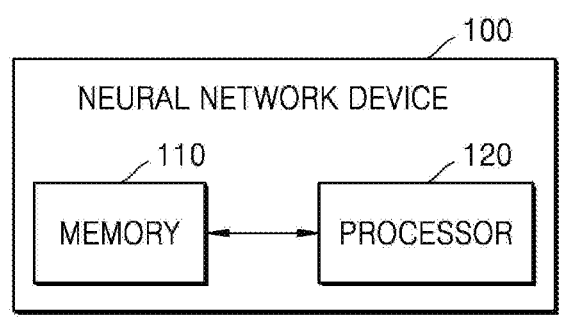
FIG. 3 is a diagram illustrating an example of hardware components of a neural network device.

FIG. 3 is a diagram illustrating an example of hardware components of a neural network device 100.

The neural network device 100 may be implemented as various types of apparatuses, such as a personal computer (PC), a server, a mobile device, an embedded device, etc. For example, the neural network device 100 may correspond to a smartphone, a tablet device, an augmented reality (AR) device, an Internet of things (IoT) device, an autonomous vehicle, a robotic device, a medical device, etc., which perform voice recognition, image recognition, image classification, etc., by using a neural network, but is not limited thereto. In another example, the neural network device 100 may include a hardware (HW) accelerator exclusively equipped in the apparatuses described above, a neural processing unit (NPU) or tensor processing unit (TPU), which is an exclusive module configured to drive a neural network, or a HW accelerator, such as a neural engine, but is not limited thereto.

In an example, the neural network apparatus 100 may be configured to process image data in an input image to the neural network apparatus 100 to extract information about the input image for image recognition, image verification, or image classification. For example, the neural network apparatus 100 performs convolution with respect to image data, or one or more input feature maps corresponding to the input image, to generate an output feature map. The neural network apparatus 100 generates an image recognition output, an image verification indication, or an image classification output based on information in the output feature map. The neural network apparatus 100 may indicate the result of the image recognition, verification or classification, either explicitly or implicitly. For example, the recognized, verified, or classified image may be explicitly indicated through display in text form on a display of the neural network apparatus 100 or audibly fed back to the user or another user, or implicit indications may be provided through additional operations, or selective non-operations, of the neural network apparatus 100 based on the result of the image recognition, verification, or classification.

According to another example, the neural network apparatus 100 may be configured to process audio data in voice entry to extract information about the voice entry for voice recognition or speech-to-text translation of the voice entry. For example, the neural network apparatus 100 performs convolution with respect to one or more input feature maps corresponding to the voice entry to generate an output feature map. The neural network apparatus 100 generates a voice recognition output or a text translation output based on information in the output feature map. The neural network apparatus 100 may indicate the result of the speech recognition or speech-to-text translation, either explicitly or implicitly. For example, the recognized speech may be explicitly indicated through display in text form on a display of the neural network apparatus 100 or audibly fed back to the user or another user, or implicit indications may be provided through additional operations, or selective non-operations, of the neural network apparatus 100 based on the result of the speech recognition. For example, the neural network apparatus 100 may further perform a translation operation based on the recognition result, unlock the neural network apparatus 100 when the neural network apparatus 100 is a mobile device, or perform other operations of such an electronic device example.

Referring to FIG. 3, the neural network device 100 may include a processor 120 and a memory 110. FIG. 3 illustrates the neural network device 100 including only components related to the present embodiments. The neural network device 100 may further include other general-purpose components in addition to the components illustrated in FIG. 3.

The processor 120 may control general functions for executing the neural network device 100. For example, the processor 120 may control the neural network device 100 by executing programs stored in the memory 110 in the neural network device 100. The processor 120 may be implemented as a central processing unit (CPU), a graphics processing unit (GPU), an application processor (AP), etc., included in the neural network device 100, but is not limited thereto. Further details regarding the processor 120 are provided below.

The memory 110 is hardware storing a variety of data processed in the neural network device 100. For example, the memory 110 may store data processed or to be processed in the neural network device 100. Also, the memory 110 may store applications, drivers, etc. to be driven by the neural network device 100. The memory 110 may include random-access memory (RAM), such as dynamic random-access memory (DRAM) and static random-access memory (SRAM), read-only memory (ROM), electrically erasable programmable read-only memory (EEPROM), CD-ROM, blue-rays or other optical disc storages, a hard disk drive (HDD), a solid state drive (SSD), or flash memory. Further details regarding the proc memory 110 are provided below.

In another example, the memory 110 may be an on-chip memory. In an example, the neural network device 100 includes only the memory 110 in the form of the on-chip memory and perform operations without accessing an external memory. For example, the memory 110 may be an SRAM implemented in the form of the on-chip memory. In this case, a kind of memory mainly used as an external memory such as a DRAM, a ROM, an HDD, and an SSD may not be used as the memory 110, unlike the above.

The processor 120 may read/write neural network data, for example, image data, feature map data, kernel data, etc., from/to the memory 110 and execute a neural network by using the read/written data. When the neural network is executed, the processor 120 may repeatedly perform convolution operations between an input feature map and a kernel, in order to generate data with respect to an output feature map. Here, a number of operations of the convolution operation may be determined, depending on various factors, such as, for example, the number of channels of the input feature map, the number of channels of the kernel, a size of the input feature map, a size of the kernel, a precision of a value. The neural network driven in the neural network device 100 may be implemented as a complicated architecture, where the processor 120 performs the convolution operation with an operation count of up to hundreds of millions to tens of billions, and the frequency at which the processor 120 accesses the memory 110 for the convolution operations rapidly increases.

In an example, the neural network device 100 includes neuromorphic hardware, which performs CNN mapping.

Neuromorphic hardware may perform operations using only an on-chip memory without using an external memory. For example, neuromorphic hardware may perform operations without a memory update during image processing by performing CNN mapping or the like using only the on-chip memory, without using the external memory (e.g., an off-chip memory, etc.)

In an example, the processor 120 performs operations on a plurality of inputs. The processor 120 may perform operations on input data including a first input and a second input. The first input or the second input may represent all or a part of an input feature map or input image data. For example, the first input may represent data with respect to a first region of the input feature map or the input image data, and the second input may represent data with respect to a second region of the input feature map or the input image data.

The processor 120 may not physically allocate kernels reused at different positions in CNN mapping to other memories but actually arrange the kernels in only one position and perform operations on output data (e.g., data with respect to an output image) over various times by using an input image of another position over time. The processor 120 may obtain the output data by perform operations on each region of the output image multiple times.

The processor 120 may receive the first input and perform operations between the first input and a plurality of kernels to obtain a first result.

In an example, the first input includes the data with respect to the first region of the input feature map.

The processor 120 may perform operations between the first input and a plurality of kernels. For example, the processor 120 may perform an operation between the first input and a first kernel (e.g., a kernel for red) to obtain a 1-1th result, perform an operation between the first input and a second kernel (for example, a kernel for green) to obtain a 1-2th result, and perform an operation between the first input and a third kernel (e.g., a kernel for blue) to obtain a 1-3th result. The processor 120 may obtain the first result using the 1-1th, 1-2th and 1-3th results. In an example, the processor 120 may obtain the first result by adding the 1-1th result, the 1-2th result, and the 1-3th result.

The processor 120 may receive the second input at a time delayed by a first interval from a time when the first input is received and perform operations between the second input and the plurality of kernels to obtain a second result.

In an example, the second input includes the data with respect to the second region of the input feature map.

The processor 120 may receive the second input at the time delayed by the first interval from the time when the first input is received. The processor 120 may perform operations between the received second input and a plurality of kernels. For example, the processor 120 may perform an operation between the second input and the first kernel (e.g., the kernel for red) to obtain a 2-1th result, perform an operation between the second input and the second kernel (for example, the kernel for green) to obtain a 2-2th result, and perform an operation between the second input and the third kernel (e.g., the kernel for blue) to obtain a 2-3th result. The processor 120 may obtain the second result using the 2-1th, 2-2th and 2-3th results. In an example, the processor 120 may obtain the second result by adding the 2-1th result, the 2-2th result, and the 2-3th result. Also, the plurality of kernels used to obtain the first result and the plurality of kernels used to obtain the second result may be the same.

The processor 120 may obtain output data with respect to the input data using the first result and the second result.

The input data may include feature map image data. For example, the input data may be 2D image data. As another example, the input data may be 3D image data. In another example, the input data may be voice data.

When the input data is image data, the processor 120 may obtain the output data with respect to the input data by using the first result, which is a processing result for the first region and the second result, which is a processing result for the second region.

The first region and the second region may be partially overlapped. For example, when the first region and the second region have a 2×2 size, a region of a 1×2 size may be overlapped between the first region and the second region.

The first region and the second region may be adjacent to each other. For example, the second region may be located on a right side of the first region. In another example, the second region may be located on a lower side of the first region.

Figure 4:
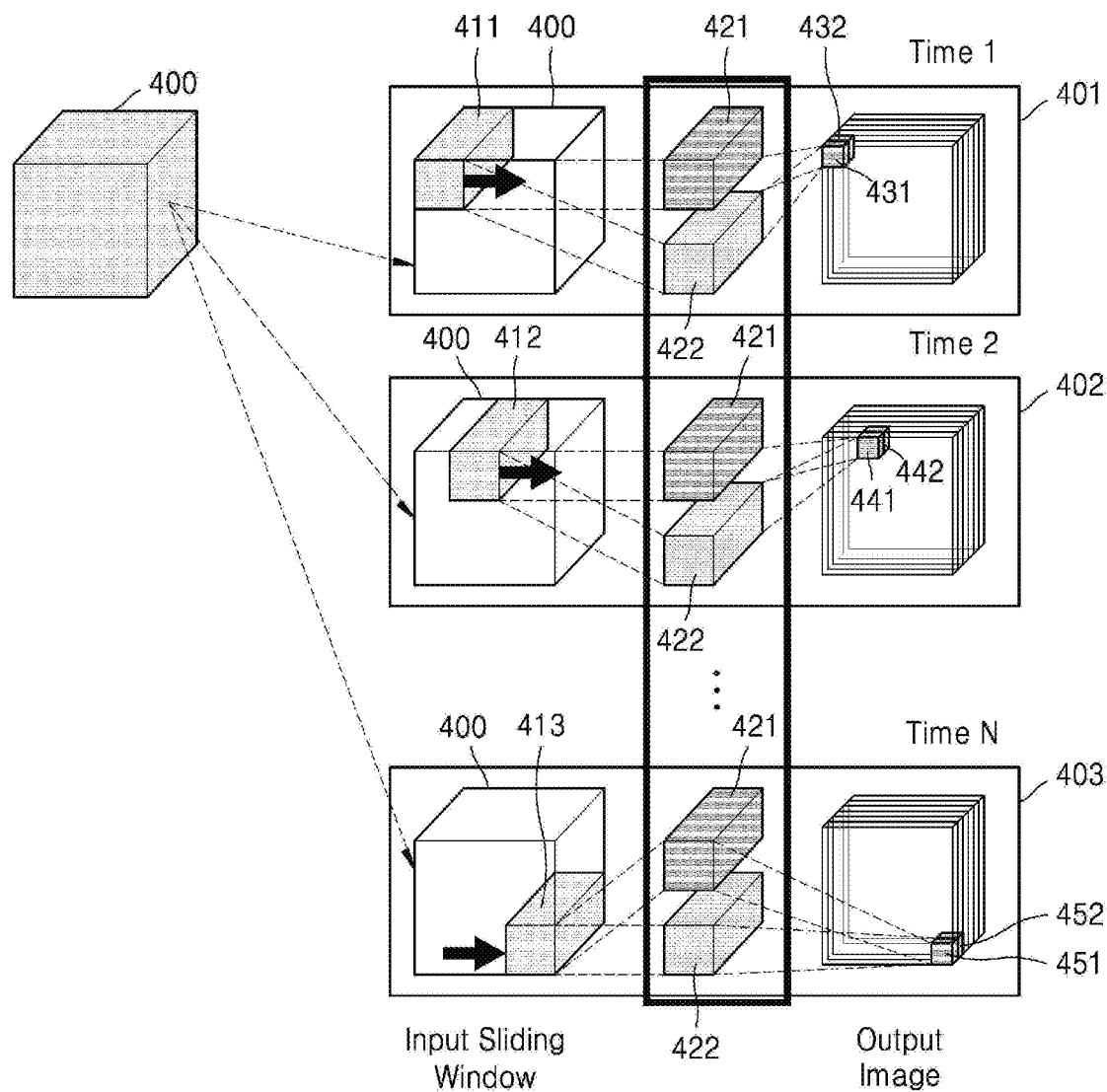
FIG. 4 is a diagram illustrating an example in which a neural network device processes a plurality of inputs included in input data a plurality of times.

FIG. 4 is a diagram illustrating an example in which the neural network device 100 processes a plurality of inputs 411, 412, and 413 included in input data 400 a plurality of times.

The input data 400 may include the first input 411, the second input 412, and the third input 413.

A plurality of kernels may include a first kernel 421 and a second kernel 422.

First results may include a 1-1th result 431 and a 1-2th result 432. Second results may include a 2-1th result 441 and a 2-2th result 442. Third results may include a 3-1th result 451 and a 3-2th result 452.

The neural network device 100 may perform operations between the first input 411 and the plurality of kernels 421 and 422 to obtain the first results 431 and 432, perform operations between the second input 412 and the plurality of kernels 421 and 422 to obtain the second results 441 and 442, and perform operations between the third input 413 and the plurality of kernels 421 and 422 to obtain the third results 451 and 452.

The input data 400 may be 3D image data. The input data 400 may include multiple parts such as, for example, the first input 411, the second input 412, and the third input 413. In an example, the first input 411 and the second input 412 may partially overlap. In another example, the first input 411 and the second input 412 may be adjacent to each other.

The 1-1th result 431 and the 1-2th result 432 included in the first results may represent resultant data of different layers. The resultant data may mean data representing an output image.

Figure 5:
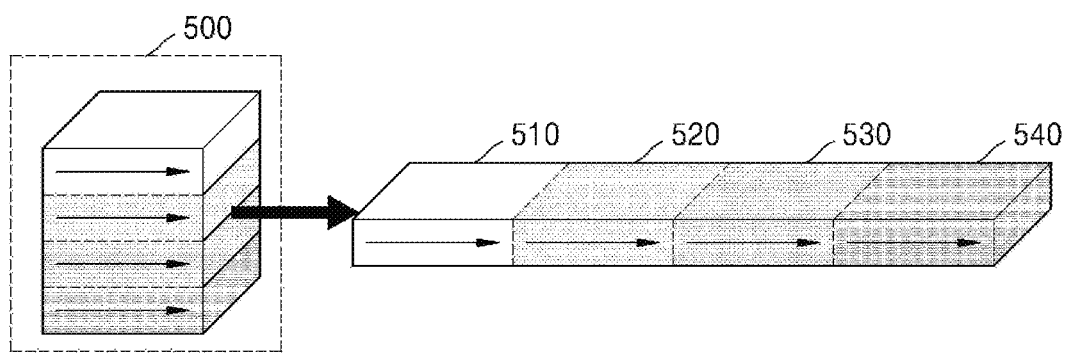
FIG. 5 is a diagram illustrating an example in which a neural network device generates data streams.

FIG. 5 is a diagram illustrating an example in which the neural network device 100 generates data streams 510, 520, 530, and 540. Referring to FIG. 5, the neural network device 100 schematically illustrates the example in which the neural network device 100 obtains the data streams 510, 520, 530, and 540 from input data 500.

The neural network device 100 may generate the data streams 510, 520, 530, and 540 including first data 510, second data 520, third data 530, and fourth data 540 by sequentially outputting the first data 510, the second data 520, the third data 530, and the fourth data 540 included in the input data 500.

The generated data streams 510, 520, 530 and 540 may be transmitted to the processor 120 included in the neural network device 100. The processor 120 may perform operations between the data streams 510, 520, 530, and 540 and a plurality of kernels.

Figure 6:
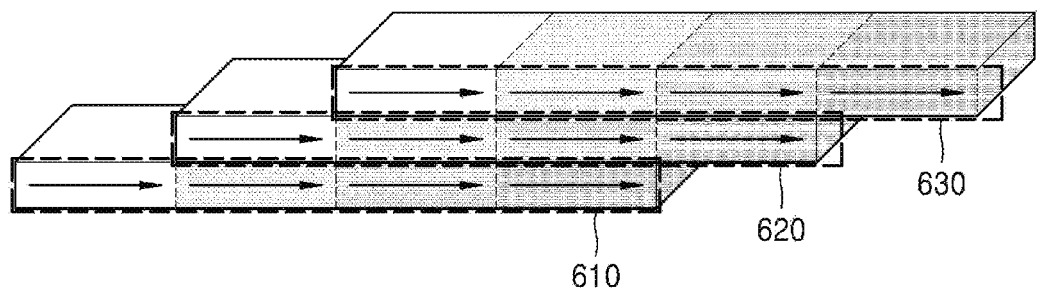
FIG. 6 is a diagram illustrating an example of a plurality of data streams having different delay times.

FIG. 6 is a diagram illustrating an example of a plurality of data streams 610, 620, and 630 having different delay times. FIG. 6 diagrammatically shows the example in which the neural network device 100 obtains the plurality of data streams 610, 620, and 630 having different delay times generated from the input data 500.

The neural network device 100 may generate the data streams 610, 620, and 630 having different delay times. For example, the first data stream 610, the second data stream 620, and the third data stream 630 may have different delay times. For example, a delay time of the first data stream 610 is 0 cycle, a delay time of the second data stream 620 is 1 cycle delay time, and a delay time of the third data stream 630 is 2 cycle delay time.

In an example, the delay time includes an axonal delay time.

In an example, the neural network device 100 generates the plurality of data streams 610, 620, and 630 having different delay times by replicating and temporally rearranging the plurality of data streams 610, 620, and 630 several times using an axonal delay time for each neuron of a neuromorphic device and various synapses.

Figure 7:
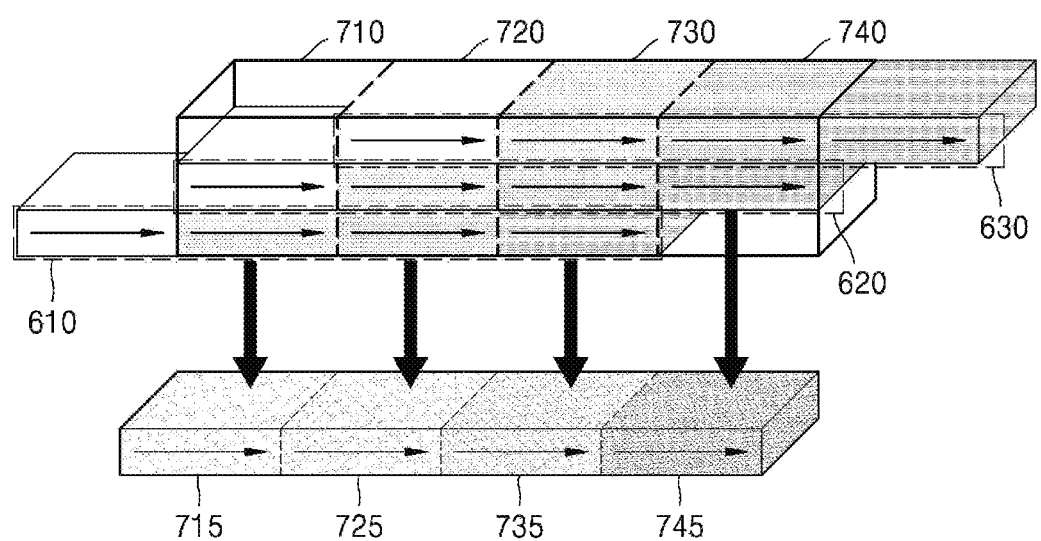
FIG. 7 is a diagram illustrating an example in which a neural network device obtains operation results with a plurality of kernels with respect to a plurality of data streams having different delay times.

FIG. 7 is a diagram illustrating an example in which the neural network device 100 obtains operation results with a plurality of kernels with respect to the plurality of data streams 610, 620, and 630 having different delay times. FIG. 7 diagrammatically shows the example in which the neural network device 100 obtains a plurality of inputs 710, 720, 730, and 740 from the plurality of data streams 610, 620, and 630 having different delay times and obtains a plurality of results 715, 725, 735, and 745 through operations between the plurality of inputs 710, 720, 730, and 740 and the plurality of kernels.

In an example, the neural network device 100 obtains the first input 710, the second input 720, the third input 730, and the fourth input 740 from the plurality of data streams 610, 620, 630 having different delay times.

The neural network device 100 may perform operations between the first input 710 and the plurality of kernels to obtain the first result 715, perform operations between the second input 720 and the plurality of kernels to obtain the second result 725, perform operations between the third input 730 and the plurality of kernels to obtain the third result 735, and perform operations between the fourth input 740 and the plurality of kernels to obtain the fourth result 745. Each of the results 715, 725, 735, and 745 may represent data with respect to an output image. For example, each of the results 715, 725, 735, and 745 may include data with respect to one or more pixels. Also, each of the results 715, 725, 735, and 745 may be used as an input of a next layer. For example, each of the results 715, 725, 735, and 745 may be used as the input of the next layer by being overlapped and transmitted.

Figure 8:
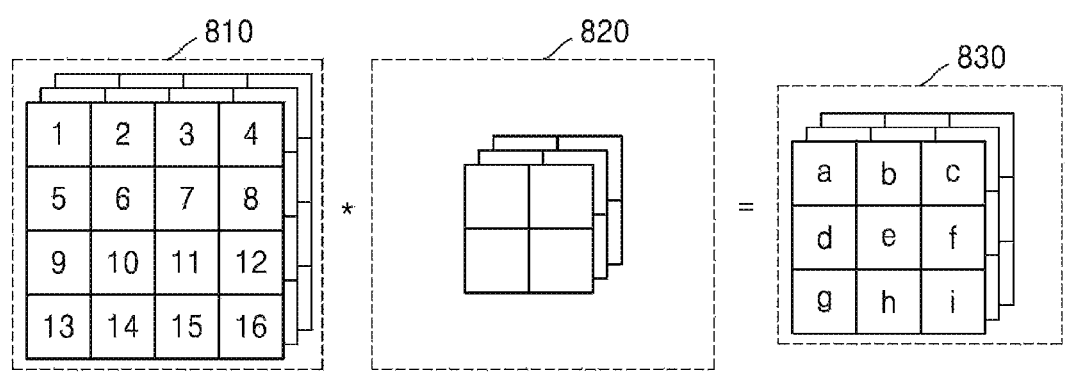
FIG. 8 is a diagram illustrating an example in which a neural network device performs an operation between an input and a kernel.

FIG. 8 is a diagram illustrating an example in which the neural network device 100 performs an operation between an input and a kernel.

According to an example, input data 810 may be 4×4×3 image data, several kernels 820 may include 2×2×3 kernels, and output data 830 may be 3×3×3 image data. A first layer of the output data 830 may include a 1-1th result (a), a 2-1th result (b), a 3-1th result (c), a 4-1th result (d), a 5-1th result (e), a 6-1th result (f), a 7-1th result (g), an 8-1th result (h), and a 9-1th result (i). In a similar manner, a second layer of the output data 830 may include 1-2th through 9-2th results, and a third layer of the output data 830 may include 1-3th through 9-3th results.

Figure 9:
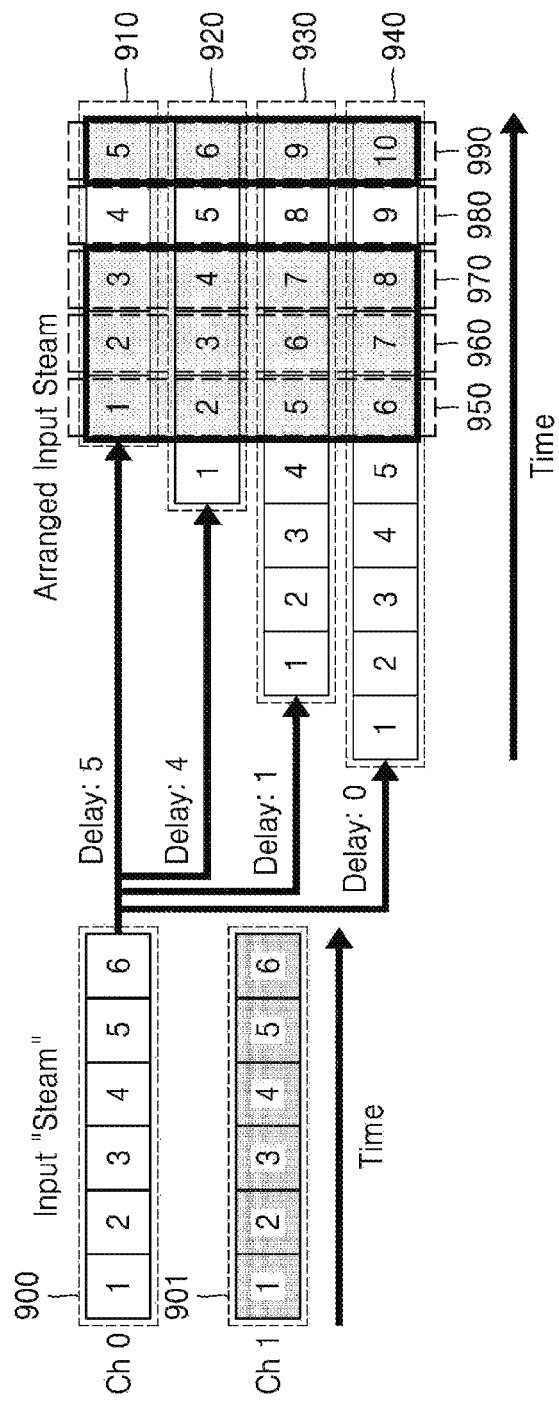
FIG. 9 is a diagram illustrating an example in which a neural network device obtains a plurality of data streams having different delay times.

FIG. 9 is a diagram illustrating an example in which the neural network device 100 obtains a plurality of data streams 910, 920, 930, and 940 having different delay times.

In an example, the neural network device 100 generates data streams 900 and 901 from input data. The neural network device 100 may generate the plurality of data streams 910, 920, 930, and 940 having different delay times from the generated data streams 900 and 901. For example, the neural network device 100 may generate the first data stream 940 with a delay time of 0, the second data stream 930 with a delay time of 1, the third data stream 920 with a delay time of 4, and the fourth data stream 910 with a delay time of 5 using the data stream 900 with respect to a channel 0.

In an example, the neural network device 100 obtains a plurality of inputs from the plurality of data streams 910, 920, 930, and 940 having different delay times. For example, the neural network device 100 may obtain a first input 950, a second input 960, a third input 970, and a fourth input 990 using data obtained at the same cycle from the first data stream 940 to the fourth data stream 910. The first input 950 to the fourth input 990 may represent a part of an input feature map or an input image. For example, the first input 950 may represent data with respect to a first region (pixels 1, 2, 5, and 6) of the input feature map, the second input 960 may represent data with respect to a second region (pixels 2, 3, 6, and 7) of the input feature map, the third input 970 may represent data with respect to a third region (pixels 3, 4, 7, and 8) of the input feature map, and the fourth input 990 may represent data with respect to a fourth region (pixels 5, 6, 9, and 10) of the input feature map.

The neural network device 100 according to an embodiment may generate output data using some of the inputs 950, 960, 970, 980, and 990 obtained from the plurality of data streams 910, 920, 930, and 940 having different delay times. For example, the neural network device 100 may generate the output data using the first input 950, the second input 960, the third input 970, and the fourth input 990 among the inputs 950, 960, 970, 980, and 990 obtained from the plurality of data streams 910, 920, 930, and 940 having different delay times. In this case, the fifth input 980 may not be used for generating the output data.

Figure 10:
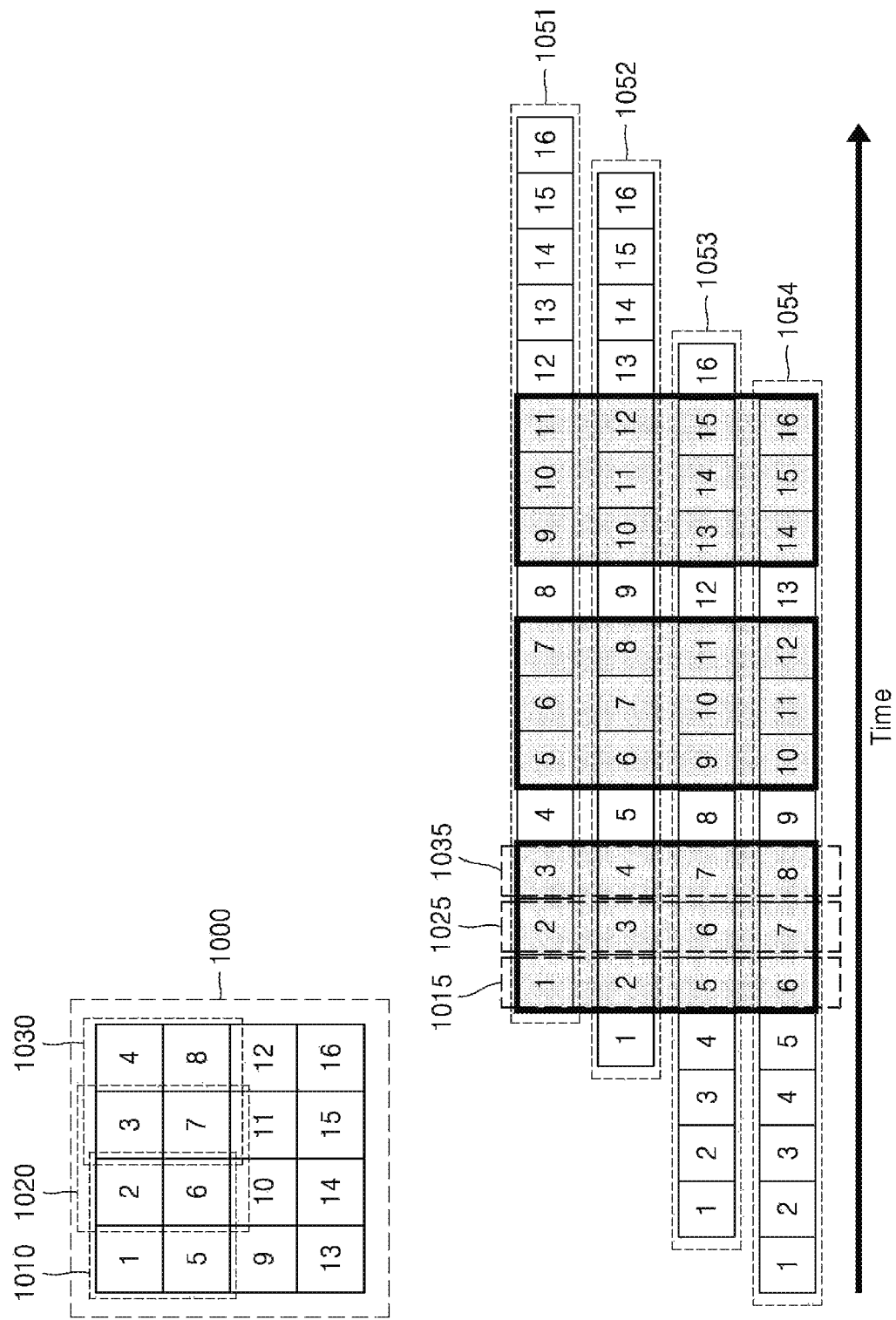
FIG. 10 is a diagram illustrating an example in which a neural network device obtains data with respect to a plurality of regions from a plurality of data streams having different delay times.

FIG. 10 is a diagram illustrating an example in which the neural network device 100 obtains data with respect to a plurality of regions 1010, 1020, and 1030 from a plurality of data streams 1054, 1053, 1052, and 1051 having different delay times.

When input data 1000 is 4×4 image data or a feature map, the neural network device 100 may generate the plurality of data streams 1054, 1053, 1052, and 1051 having different delay times from the input data 1000 and generate a plurality of inputs 1015, 1025, and 1035 from the generated plurality of data streams 1054, 1053, 1052, and 1051. For example, the neural network device 100 may generate the first data stream 1054 having a delay time of 0, the second data stream 1053 having a delay time of 1, the third data stream 1052 having a delay time of 4, and the fourth data stream 1051 having a delay time of 5 from the input data 1000 and generate the first input 1015, the second input 1025, and the third input 1035 from the generated first data stream 1054 to fourth data stream 1051.

In an example, the plurality of inputs 1015, 1025, and 1035 represents part of the input data 1000. For example, the first input 1015 may represent data with respect to the first region 1010 of the input data 1000, the second input 1025 may represent data with respect to the second region 1020 of the input data 1000, and the third input 1035 may represent data with respect to the third region 1030 of the input data 1000.

Figure 11:
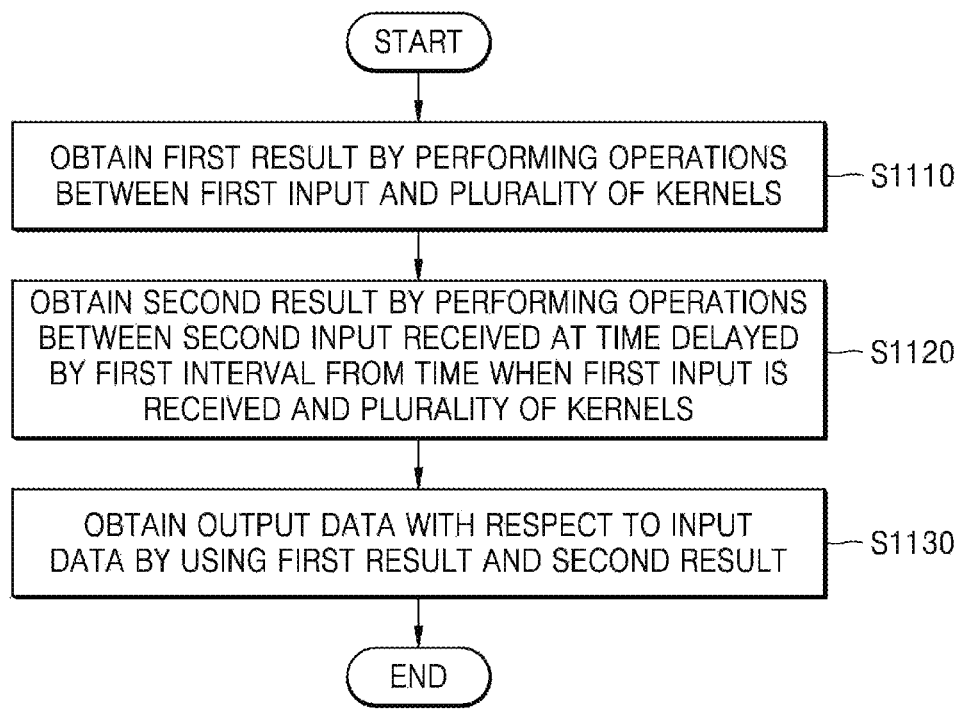
FIG. 11 is a diagram illustrating a method, performed by a neural network device, of obtaining output data from a first input and a second input.

FIG. 11 is a diagram illustrating an example of a method performed by the neural network device 100 of obtaining output data from a first input and a second input. The operations in FIG. 11 may be performed in the sequence and manner as shown, although the order of some operations may be changed or some of the operations omitted without departing from the spirit and scope of the illustrative examples described. Many of the operations shown in FIG. 11 may be performed in parallel or concurrently. One or more blocks of FIG. 11, and combinations of the blocks, can be implemented by special purpose hardware-based computer that perform the specified functions, or combinations of special purpose hardware and computer instructions. In addition to the description of FIG. 11 below, the descriptions of FIGS. 1-10 are also applicable to FIG. 11, and are incorporated herein by reference. Thus, the above description may not be repeated here.

In operation S1110, in an example, the neural network device 100 performs operation between the first input and a plurality of kernels to obtain a first result.

In an example, the first input may include data with respect to a first region of an input feature map or input image data.

The neural network device 100 may perform operations between the first input and the plurality of kernels. For example, the neural network device 100 may perform an operation between the first input and a first kernel (e.g., a kernel for red) to obtain a 1-1th result, perform an operation between the first input and a second kernel (e.g., a kernel for green) to obtain a 1-2th result, and perform an operation between the first input and a third kernel (e.g., a kernel for Blue) to obtain a 1-3th result. The neural network device 100 may obtain the first result using the 1-1th result, the 1-2th result, and the 1-3th result. For example, the neural network device 100 may obtain the first result by adding the 1-1th result, the 1-2th result, and the 1-3th result.

In operation S1120, the neural network device 100 performs operations between a second input received at a time delayed by a first interval from a time when the first input is received and a plurality of kernels to obtain a second result. The plurality of kernels used to obtain the second result may be the same as the plurality of kernels used in operation S1110.

In an example, the second input may include data with respect to a second region of the input feature map or the input image data.

The neural network device 100 according to an embodiment may receive the second input at the time delayed by the first interval from the time when the first input is received. The neural network device 100 may perform operations between the received second input and the plurality of kernels. For example, the neural network device 100 may perform an operation between the second input and the first kernel (e.g., the kernel for red) to obtain a 2-1th result, perform an operation between the second input and the second kernel (e.g. the kernel for green) to obtain a 2-2th result, and perform an operation between the second input and the third kernel (e.g., the kernel for blue) to obtain a 2-3th result. The neural network device 100 may obtain the second result using the 2-1th result, the 2-2th result, and the 2-3th result. For example, the neural network device 100 may obtain the second result by adding the 2-1th result, the 2-2th result, and the 2-3th result.

In operation S1130, the neural network device 100 may obtain output data with respect to the input data using the first result and the second result.

The input data may include a feature map or image data. For example, the input data may be 2D image data. As another example, the input data may be 3D image data.

When the input data is image data, the processor 120 may obtain the output data with respect to the input data using the first result, which is a processing result with respect to the first region, and the second result, which is a processing result with respect to the second region.

In an example, the first region and the second region may be partially overlapped. For example, when the first region and the second region have a 2×2 size, a region of 1×2 size may be overlapped between the first region and the second region but is not limited thereto. The first region and the second region of various sizes may be implemented.

In an example, the first region and the second region may be adjacent to each other. For example, the second region may be located on a right side of the first region. As another example, the second region may be located on a lower side of the first region but is not limited thereto. The first region and the second region may be implemented in various mutual positions.

Figure 12:
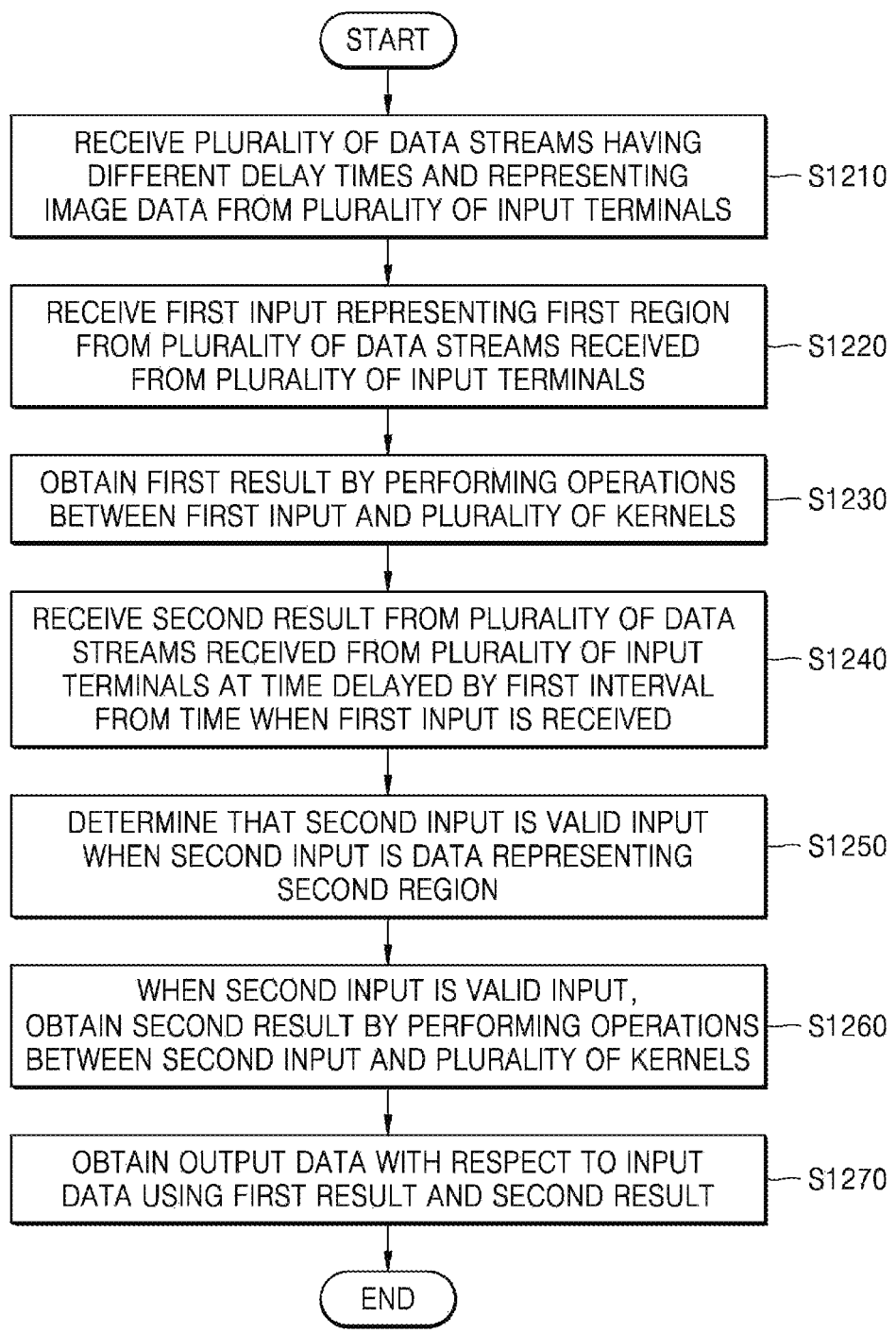
FIG. 12 is a diagram illustrating an example of a method, performed by a neural network device of obtaining output data from a plurality of data streams having different delay times.

FIG. 12 is a diagram illustrating an example of a method performed by the neural network device 100 of obtaining output data from a plurality of data streams having different delay times. The operations in FIG. 12 may be performed in the sequence and manner as shown, although the order of some operations may be changed or some of the operations omitted without departing from the spirit and scope of the illustrative examples described. Many of the operations shown in FIG. 12 may be performed in parallel or concurrently. One or more blocks of FIG. 12, and combinations of the blocks, can be implemented by special purpose hardware-based computer that perform the specified functions, or combinations of special purpose hardware and computer instructions. In addition to the description of FIG. 12 below, the descriptions of FIGS. 1-11 are also applicable to FIG. 12, and are incorporated herein by reference. Thus, the above description may not be repeated here.

In operation S1210, in an example, the neural network device 100 receives the plurality of data streams having different delay times and representing image data from a plurality of input terminals.

In an example, the neural network device 100 obtains the plurality of data streams having different delay times and representing the image data. The neural network device 100 may obtain the plurality of data streams having different delay times by obtaining a data stream from input data representing the image data and transmitting the obtained data stream a plurality of times.

The neural network device 100 may obtain the plurality of data streams having different delay times by receiving the generated plurality of data streams through the plurality of input terminals.

In operation S1220, the neural network device 100 receives a first input representing a first region from the plurality of data streams received from the plurality of input terminals.

For example, the neural network device 100 may obtain data obtained at the plurality of input terminals at a specific time as the first input. For example, the neural network device 100 may obtain data obtained at the plurality of inputs in a sixth cycle as the first input (see FIGS. 9 and 10). The first input may represent a first region of the image data.

In operation S1230, in an example, the neural network device 100 performs operations between the first input and a plurality of kernels to obtain a first result.

For example, the neural network device 100 may obtain the first result by using a 1-1th operation result that is an operation result between a 1-1th input constituting the first input and a first kernel, a 1-2th operation result that is an operation result between a 1-2th input constituting the first input and a second kernel, and a 1-3th operation result that is an operation result between a 1-3th input constituting the first input and a third kernel. As one example, the neural network device 100 may generate the first result by adding the 1-1th operation result, the 1-2th operation result, and the 1-3th operation result.

In operation S1240, in an example, the neural network device 100 receives a second input from the plurality of data streams received from the plurality of input end at a time delayed by a first interval from a time when the first input is received.

For example, the neural network device 100 may obtain data obtained at the plurality of input terminals at a specific time as the second input. As an example, the neural network device 100 may obtain data obtained at the plurality of input terminals in a seventh cycle as the second input. (see FIGS. 9 and 10)

In operation S1250, in an example, the neural network device 100 determines the second input as a valid input when the second input is data representing a second region.

The second region may be determined based on a relative position with respect to the first region.

For example, the first region and the second region may be partially overlapped. For example, when the first area and the second area have a 2×2 size, a region of a 1×2 size may be overlapped between the first region and the second region.

As another example, the first region and the second region may be adjacent to each other. For example, the second region may be located on a right side of the first region. As another example, the second region may be located on a lower side of the first region.

The second region may be determined according to various methods. When the second input is the data representing the second region, the neural network device 100 may determine the second input as the valid input.

As shown in FIG. 10, in a similar manner to that described above in operations S1210 to S1250, the neural network device 100 according to an embodiment may obtain data obtained at the plurality of input terminals in a 7th cycle as to a valid third input, obtain data obtained at the plurality of input terminals in an 8th cycle as a valid fourth input, obtain data obtained at the plurality of input terminals in a 10th cycle as a valid fifth input, obtain data obtained at the plurality of input terminals in an 11th cycle as a valid sixth input, obtain data obtained at the plurality of input terminals in a 12th cycle as a valid seventh input, obtain data obtained at the plurality of input terminals in a 14th cycle as a valid eighth input, and obtain data obtained at the plurality of input terminals in a 15th cycle as a valid ninth input.

In operation S1260, in an example, the neural network device 100 performs operations between the second input and a plurality of kernels to obtain a second result when the second input is a valid input.

For example, the neural network device 100 may obtain the second result by using a 2-1th operation result, which is an operation result between a 2-1th input constituting the second input and the first kernel, a 2-2th operation result, which is an operation result between a 2-2th input constituting the second input and the second kernel, and a 2-3th operation result, which is an operation result between a 2-3th input constituting the second input and the third kernel. As an example, the neural network device 100 may generate the second result by adding the 2-1th operation result, the 2-2th operation result, and the 2-3th operation result.

In operation S1270, in an example, the neural network device 100 obtains output data with respect to the input data using the first result obtained in operation S1230 and the second result obtained in operation S1260.

The output data may include operation results between the input data and the plurality of kernels. The output data which is the operation results with respect to the image data may be output at one time (e.g., one cycle) or sequentially.

Figure 13:
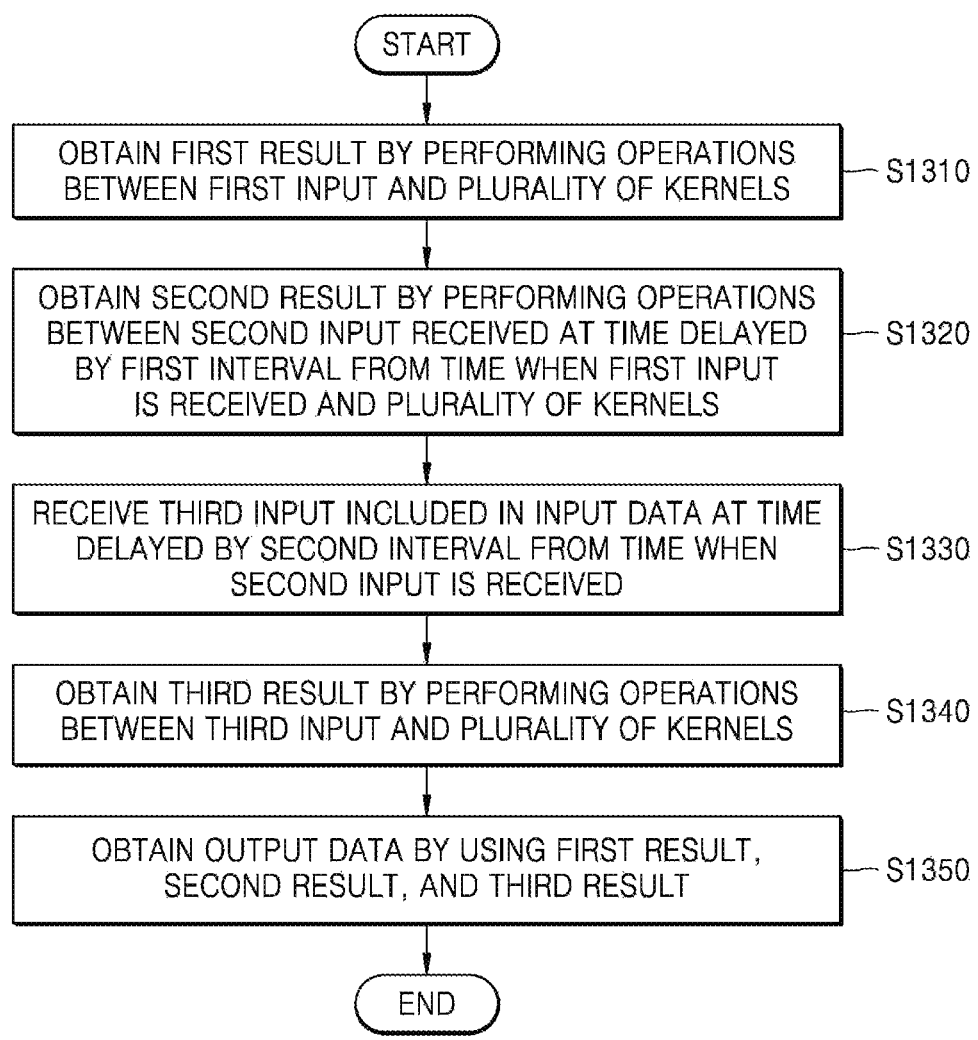
FIG. 13 is a diagram illustrating an example of a method, performed by a neural network device, of obtaining output data using first to third inputs.

FIG. 13 is a diagram illustrating an example of a method performed by the neural network device 100 of obtaining output data using first to third inputs. The operations in FIG. 13 may be performed in the sequence and manner as shown, although the order of some operations may be changed or some of the operations omitted without departing from the spirit and scope of the illustrative examples described. Many of the operations shown in FIG. 13 may be performed in parallel or concurrently. One or more blocks of FIG. 13, and combinations of the blocks, can be implemented by special purpose hardware-based computer that perform the specified functions, or combinations of special purpose hardware and computer instructions. In addition to the description of FIG. 13 below, the descriptions of FIGS. 1-12 are also applicable to FIG. 13, and are incorporated herein by reference. Thus, the above description may not be repeated here.

Operations S1310 and S1320 correspond to operations S1110 and S1120, respectively, and thus detailed descriptions thereof will be omitted for the sake of brevity. For operations S1310 and S1320, descriptions of operations S1110 and S1120 provided above are incorporated herein by reference.

In operation S1330, in an example, the neural network device 100 receives a third input included in input data at a time delayed by a second interval from a time when a second input is received.

The second interval may be different from a first interval. For example, the first interval may correspond to a first cycle and the second interval may correspond to a second cycle.

In operation S1340, in an example, the neural network device 100 performs operations between the third input and a plurality of kernels to obtain a third result.

In an example, the plurality of kernels used to obtain the third result is the same as the plurality of kernels used in operation S1310.

In an example, the third input may include data with respect to a third region of an input feature map or input image data.

The neural network device 100 may perform operations between the received third input and a plurality of kernels. For example, the neural network device 100 may perform an operation between the third input and a first kernel (e.g., a kernel for red) to obtain a 3-1th result, perform an operation between the third input and a second kernel (e.g., a kernel for green) to obtain a result of a 3-2th result, and perform an operation between the third input and a third kernel (e.g., a kernel for blue) to obtain a 3-3th result. The neural network device 100 may obtain the third result using the 3-1th result, the 3-2th result, and the 3-3th result. For example, the neural network device 100 may obtain the third result by adding the 3-1th result, the 3-2th result, and the 3-3th result.

In operation S1350, in an example, the neural network device 100 obtains the output data using a first result, a second result, and the third result.

The output data may include operation results of the input data and the plurality of kernels. The output data which is the operation result of image data may be output at one time (e.g., one cycle) or sequentially. For example, the first result, the second result, and the third result may be sequentially output.

Figure 14:
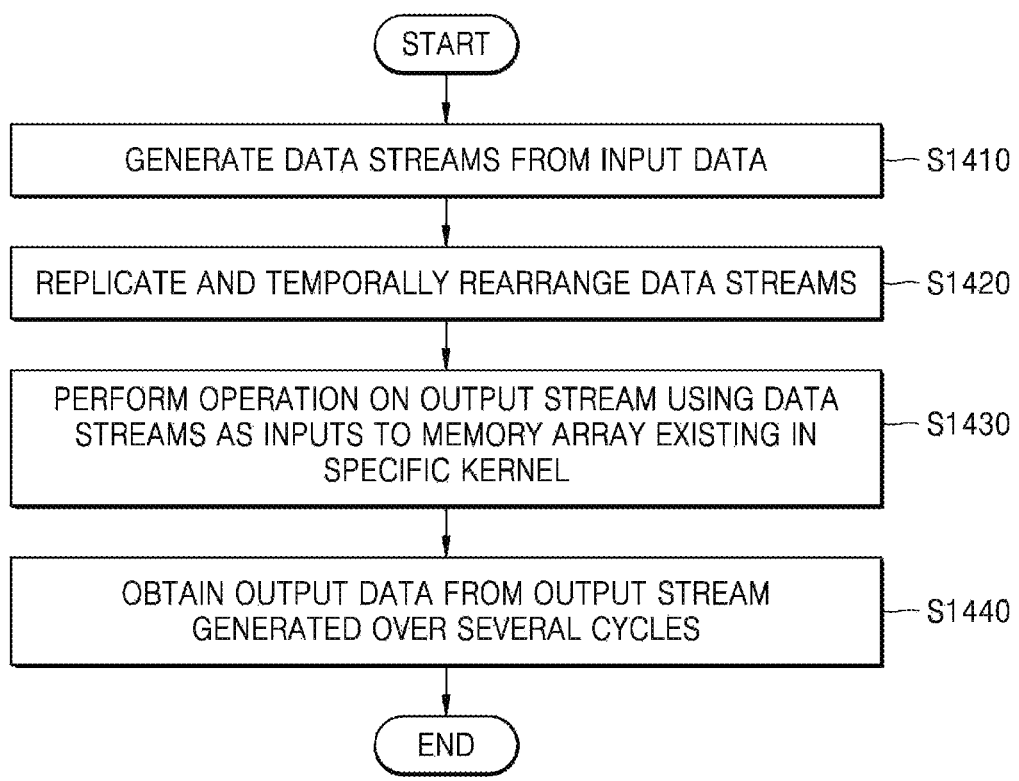
FIG. 14 is a diagram illustrating an example of a method, performed by a neural network device, of obtaining output data from input data.

FIG. 14 is a diagram illustrating an example of a method, performed by the neural network device 100, of obtaining output data from input data. The operations in FIG. 14 may be performed in the sequence and manner as shown, although the order of some operations may be changed or some of the operations omitted without departing from the spirit and scope of the illustrative examples described. Many of the operations shown in FIG. 14 may be performed in parallel or concurrently. One or more blocks of FIG. 14, and combinations of the blocks, can be implemented by special purpose hardware-based computer that perform the specified functions, or combinations of special purpose hardware and computer instructions. In addition to the description of FIG. 14 below, the descriptions of FIGS. 1-13 are also applicable to FIG. 14, and are incorporated herein by reference. Thus, the above description may not be repeated here.

In operation S1410, in an example, the neural network device 100 generates data streams from the input data. Operation S1410 may be performed in a first layer.

In operation S1420, in an example, the neural network device 100 obtains a plurality of data streams having different delay times by replicating the data streams generated in operation S1410 and temporally rearranging the data streams.

In operation S1430, in an example, the neural network device 100 performs an operation on an output stream using the plurality of data streams having different delay times as inputs to a memory array existing in a specific kernel. Operations S1420 and S1430 may be performed in an intermediate layer, and may be performed repeatedly a plurality of times.

In operation S1440, in an example, the neural network device 100 obtains the output data from the output stream generated over several cycles. The neural network device 100 may also generate an image output through the obtained output data. For example, the neural network device 100 may generate a 3D image. Also, operation S1440 may be performed in a last layer.

Figure 15A:
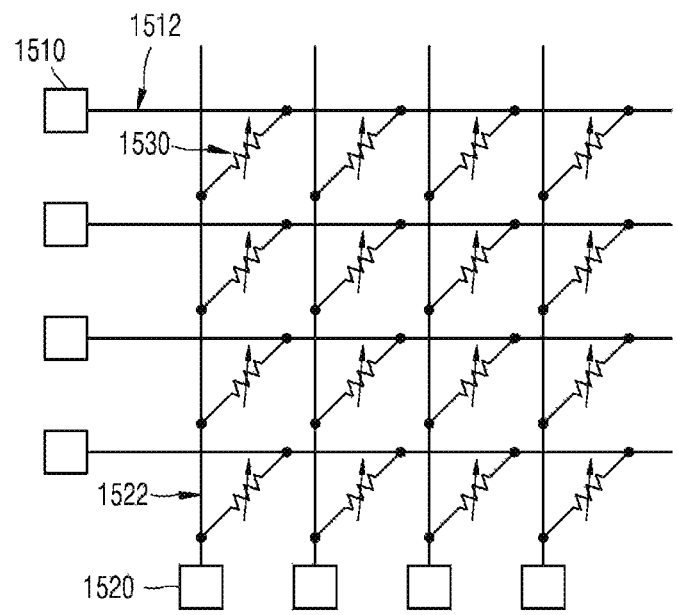
FIGS. 15A to 15B are diagrams illustrating examples for explaining a method of operating a neuromorphic device.
Figure 15B:
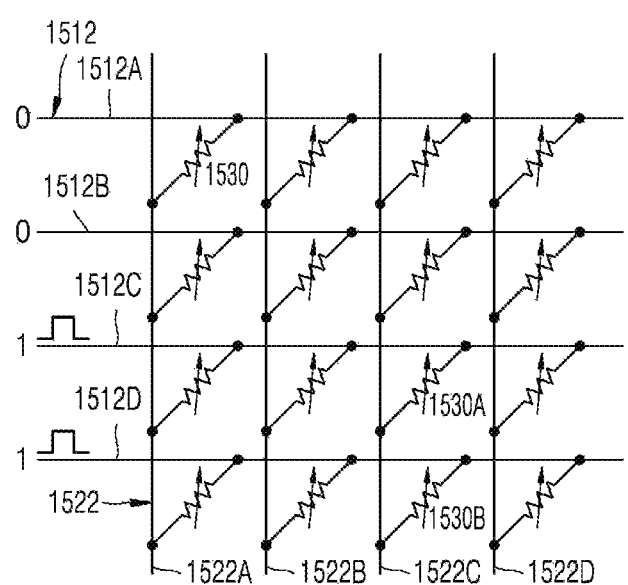

FIGS. 15A to 15B are diagrams illustrating examples for explaining a method of operating a neuromorphic device.

Referring to FIG. 15A, the neural network device may include a plurality of cores. Each of the cores may be implemented in resistive crossbar memory arrays (RCA). Specifically, each of the cores may include a plurality of presynaptic neurons 1510, a plurality of postsynaptic neurons 1520, and a plurality of synapses 1530 providing connections between the plurality of presynaptic neurons 1510 and the plurality of postsynaptic neurons 1520.

In an example, each of the cores of the neural network device includes the 4 presynaptic neurons 1510, the 4 postsynaptic neurons 1520, and the 16 synapses 1530, however, other numbers of presynaptic neurons, postsynaptic neurons, and synapses are considered to be well within the scope of the present disclosure. If the number of the presynaptic neurons 1510 is N (where N is a natural number equal to or greater than 2), the number of the postsynaptic neurons 1520 is M (where M is a natural number equal to or greater than 2, the N*M synapses 1530 may be arranged in a matrix form.

In an example, a line 1512 connected to each of the plurality of presynaptic neurons 1510 and extending in a first direction (e.g., a horizontal direction), and a second line 1522 connected to each of the plurality of postsynaptic neurons 1520 and extending in a second direction (e.g., a vertical direction) intersecting the first direction may be provided. Hereinafter, for convenience of explanation, the line 1512 extending in the first direction is referred to as a row line, and the line 1522 extending in the second direction is referred to as a column line. In an example, the plurality of synapses 1530 may be disposed in intersection points of the row lines 1512 and the column lines 1522 to connect the corresponding row lines 1512 and the corresponding column lines 1522 to each other.

The presynaptic neuron 1510 may generate a signal corresponding to specific data and send the signal to the row line 1512. The postsynaptic neuron 1520 may receive and process a synaptic signal through the synapse 1530 via the column line 1512. The presynaptic neuron 1510 may correspond to an axon. The postsynaptic neuron 1520 may correspond to a neuron. In an example, whether a neuron is a presynaptic neuron or a postsynaptic neuron is determined by its relative relationship with another neuron. For example, the presynaptic neuron 1510 may function as the postsynaptic neuron when the presynaptic neuron 1510 receives the synaptic signal in the relationship with another neuron. Similarly, the postsynaptic neurons 1520 may function as the presynaptic neuron in a case where the postsynaptic neuron 1520 sends a signal in the relationship with another neuron. The presynaptic neuron 1510 and the postsynaptic neuron 1520 may be implemented in various circuits such as, for example, complementary metal-oxide-semiconductor (CMOS).

A connection between the presynaptic neuron 1510 and the postsynaptic neuron 1520 may be via the synapse 1530. Here, the synapse 1530 is a device whose electrical conductance or weight changes according to an electric pulse applied to both ends, for example, a voltage or a current.

The synapse 1530 may include, for example, a variable resistive device. The variable resistive device may be capable of switching between different resistance states depending on the voltage or the current applied to both ends, and may have a single-layer structure or a multi-layer structure including various materials capable of having a plurality of resistance states, such as, for example, a metal oxide such as, for example, a transition metal oxide and a perovskite-based material, a phase-change material such as, for example, a chalcogenide-based material, a ferroelectric material, and a ferromagnetic material. In an example, an operation in which the variable resistance device and/or the synapse 1530 changes from a high resistance state to a low resistance state is referred to as a set operation and an operation in which the variable resistance device and/or the synapse 1530 changes from the low resistance state to the high resistance state is referred to as a reset operation.

In an example, unlike the variable resistive device used in a memory device such as RRAM, PRAM, FRAM and MRAM, the synapse 1530 of the core may have no abrupt resistance change in the set operation and the reset operation and may be implemented to have various characteristics that are distinguished from the variable resistance device in the memory device, such as exhibiting an analog behavior in which conductivity gradually changes according to the number of input electrical pulses. This is because characteristics required for the variable resistance device in the memory device are different from those required for the synapse 1530 in the core of the neural network device.

An operation of the above-described neural network device will be described with reference to FIG. 15B. For convenience of explanation, the row line 1512 may be referred to as a first row line 1512A, a second row line 1512B, a third row line 1512C and a fourth row line 1512D in order from the top to bottom and the column line 1522 may be referred to as a first column line 1522A, a second column line 1522B, a third column line 1522C and a fourth column line 1522D in order from the left to right.

Referring to FIG. 15B, in an initial state, all of the synapses 1530 may be in a state in which the conductivity is relatively low, that is, in a high resistance state. When at least a part of the plurality of synapses 1530 is in a low resistance state, an initialization operation may be further required to render the plurality of synapses 1530 in the high resistance state. Each of the plurality of synapses 1530 may have a threshold value required for a resistance and/or conductivity variation. In an example, when a voltage or current of a magnitude smaller than the threshold value is applied to both ends of each of the synapses 1530, the conductivity of the synapse 1530 does not change and when a voltage or current larger than the threshold value is applied to both ends of each of the synapses 1530, the conductivity of the synapse 1530 may change.

In this state, in order to perform an operation of outputting specific data as a result of the specific column line 1522, an input signal corresponding to specific data in response to an output of the presynaptic circuit 1510 may be input to the row line 1512. At this time, the input signal may appear as an application of an electrical pulse to each of the row lines 1512. For example, when an input signal corresponding to data of '0011' is input to the row line 1512, no electric pulse may be applied to the row line 1512 corresponding to '0', such as the first and second row line 1512A and 1512B and the electric pulse may be applied only to the row line 1512 corresponding to '1', such as the third and fourth row lines 1512C and 1512D. At this time, the column line 1522 may be driven with an appropriate voltage or current for output.

In an example, when the column line 1522 to output specific data is determined, the column line 1522 may be driven such that a voltage with a magnitude greater than that of a voltage (hereinafter a set voltage) required during the set operation is applied to the synapse 1530 located at an intersection with the row line 1512 corresponding to '1' and the remaining column lines 1522 may be driven such that a voltage with a magnitude smaller than that of the set voltage is applied to the remaining synapses 1530. For example, when the set voltage level is Vset and the column line 1522 to output data of '0011' is determined as the third column line 1522C, a magnitude of an electric pulse applied to the third and fourth row lines 1512C and 1512D may be equal to or greater than Vset and a voltage applied to the third column line 1522C may be 0V such that a voltage equal to or greater than Vset is applied to the first and second synapses 1530A and 1530B located at intersections with the third column line 1522C and the third and fourth row lines 1512C and 1512D. Accordingly, the first and second synapses 1530A and 1530B may be in the low resistance state. The conductivity of the first and second synapses 1530A and 1530B in the low resistance state may be gradually increased as the number of electrical pulses increases. The magnitude and width of applied electrical pulses may be substantially constant. A voltage applied to remaining column lines, i.e. the first, second and fourth column lines 1522A, 1522B and 1522D, may have a value between 0V and Vset, e.g. a value of ½Vset, such that a voltage lower than Vset is applied to the remaining synapses 1530 except for the first and second synapses 1530A and 1530B. Accordingly, a resistance state of the remaining synapses 1530 except for the first and second synapses 1530A and 1530B may not change. In an example, a flow of a current or an electron is indicated by a dotted arrow.

As another example, the column line 1522 to output specific data may not be determined. In this case, the column line 1522, e.g. the third column line 1522C, which arrives first at a threshold current by measuring a current flowing through each of the column lines 1522 while applying an electric pulse corresponding to the specific data to the row lines 1512, may be the column line 1522 to output the specific data.

According to the method described above, different data may be output to the different column lines 1522, respectively.

Figures 16A, 16B:
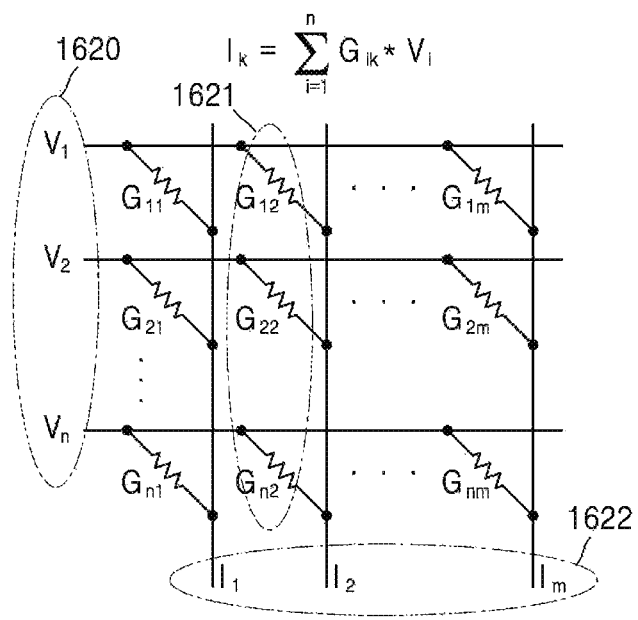
FIGS. 16A and 16B are diagrams illustrating examples for comparing a vector-matrix multiplication and an operation performed in a neural network device.

FIGS. 16A and 16B are diagrams illustrating examples for comparing a vector-matrix multiplication and an operation performed in a neural network device.

Referring first to FIG. 16A, a convolution operation between an input feature map and kernels may be performed using the vector-matrix multiplication. For example, pixel data of the input feature map may be represented by a matrix X 1610, and kernel values may be represented by a matrix W 1611. Pixel data of an output feature map may be represented by a matrix Y 1612 which is a result of a multiplication operation between the matrix X 1610 and the matrix W 1611.

Referring to FIG. 16B, a vector multiplication operation may be performed using a core of the neural network device. Referring to FIG. 16A, the pixel data of the input feature map may be received as an input value of the core, and the input value may be a voltage 1620. Also, the kernel values may be stored in a synapse of the core, i.e., a memory cell. The kernel values stored in the memory cell may be a conductance 1621. Thus, an output value of the core may be represented by a current 1622, which is a result of a multiplication operation between the voltage 1620 and the conductance 1621.

Figure 17:
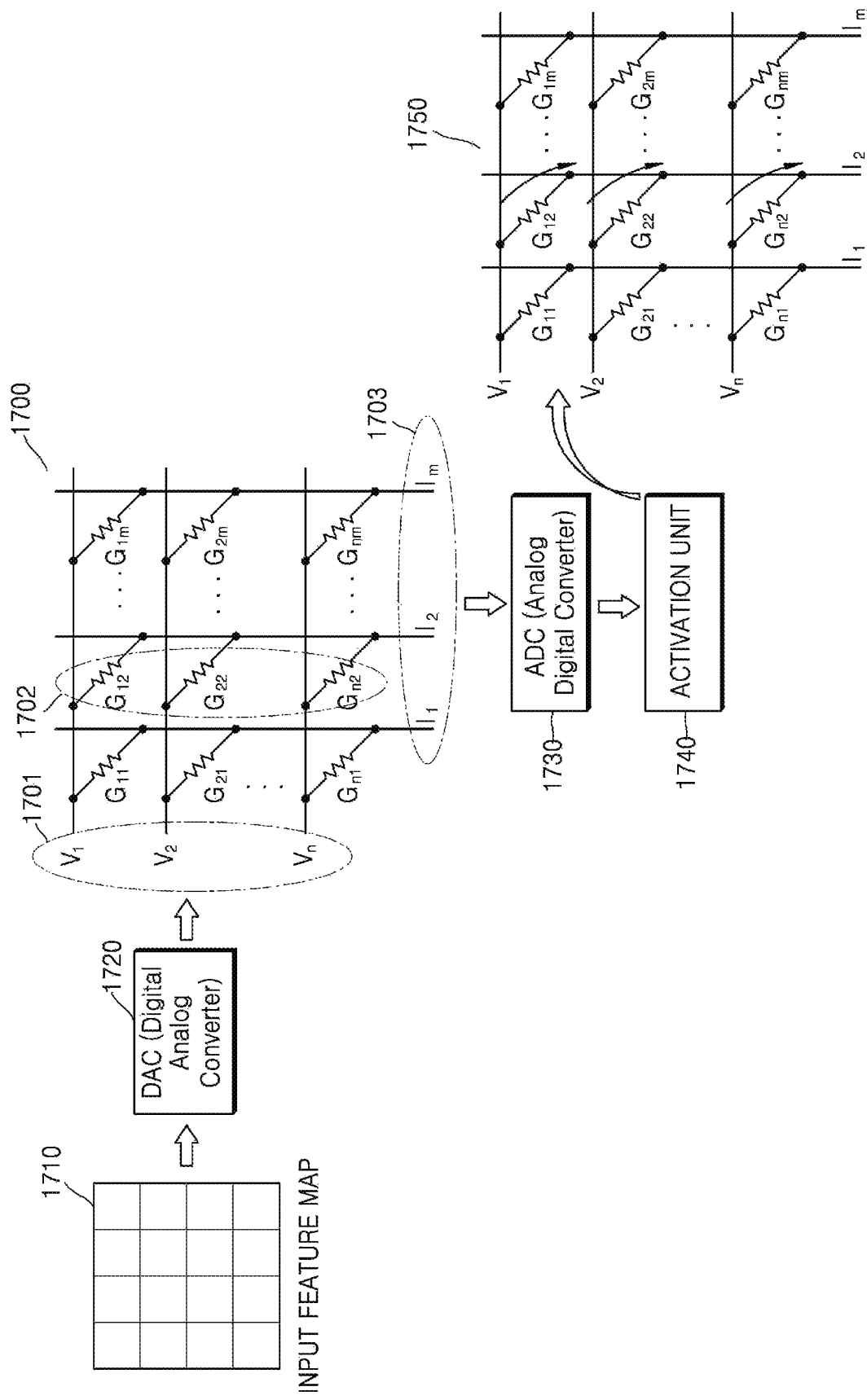
FIG. 17 is a diagram illustrating an example of a convolution operation that is performed in a neural network device.

FIG. 17 is a diagram illustrating an example of a convolution operation that is performed in a neural network device.

The neural network device may receive pixel data of an input feature map 1710. In an example, a core 1700 of the neural network device may be implemented with a RCA.

In an example, when the core 1700 is a matrix of an N×M size (where N and M are natural numbers equal to or greater than 2), the number of pixel data in the input feature map 1710 may be less than or the same as the number of columns M in the core 1700. The pixel data of the input feature map 1710 may be a parameter of a floating-point format or a fixed-point format. In another example, the number of pixel data of the input feature map 1710 may be greater than the number of the columns M of the core 1700, which will be described in detail with reference to FIG. 18.

The neural network device may receive pixel data in the form of a digital signal and may convert the received pixel data into a voltage in the form of an analog signal using a digital analog converter (DAC) 1720. The pixel data of the input feature map 1710 may have various bit resolution values, such as 1-bit, 4-bit, and 8-bit resolutions. In an example, the neural network device may use the DAC 1720 to convert the pixel data to a voltage and then receive the voltage as an input 1701 of the core 1700.

In an example, trained kernel values may be stored in the core 1700 of the neural network device. The kernel values may be stored in a memory cell of the core. The kernel values stored in the memory cell may be a conductance 1702. At this time, the neural network device may calculate an output value by performing a vector multiplication operation between the voltage 1701 and the conductance 1702. The output value may be expressed by a current 1703. Thus, the neural network device may output the same result as a convolution operation result between the input feature map 1710 and the kernels by using the core 1700.

Since the current 1703 output from the core 1700 is an analog signal, the neural network device may use an analog digital converter (ADC) 1730 to use the current 1703 as input data of another core. The neural network device may use the ADC 1730 to convert current 1703, which is the analog signal, to a digital signal. In an example, the neural network device may use the ADC 1730 to convert the current 1703 into the digital signal to have the same bit resolution as the pixel data of the input feature map 1710. For example, where the pixel data of the input feature map 1710 is a 1-bit resolution, the neural network device may use the ADC 1730 to convert the current 1703 into a 1-bit resolution digital signal.

The neural network device may use an activation unit 1740 to apply an activation function to the digital signal converted in the ADC 1730. The Sigmoid function, the Tan h function, and the Rectified Linear Unit (ReLU) function may be used as the activation function, but the activation function applicable to the digital signal is not limited thereto.

The digital signal to which the activation function is applied may be used as an input value of another core 1750. When the digital signal to which the activation function is applied is used as the input value of the core 1750, the above-described process may be applied to the other core 1750.

Figure 18:
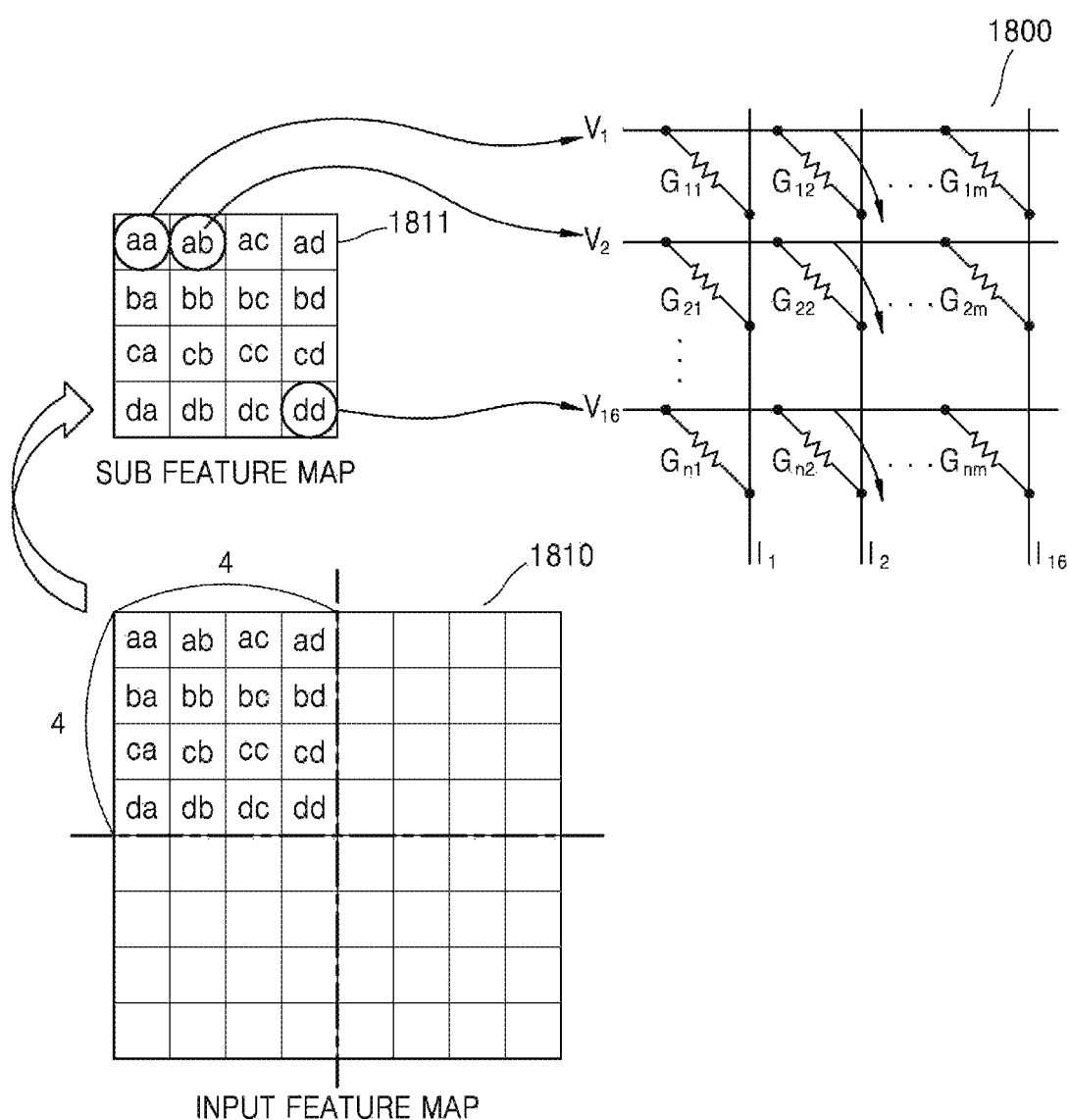
FIG. 18 is a diagram illustrating an example in which a sub feature map and a core are matched.

FIG. 18 is a diagram illustrating an example in which a sub feature map and a core are matched.

An input feature map 1810 used for learning and reasoning may have various sizes. Since the size of a core 1800 of a neural network device is limited, the number of pixel data in the single input feature map 1810 may be greater than the number of input values that may be received in the core 1800.

Referring to FIG. 18, the size of the input feature map 1810 is 8×8, and the size of the core 1800 is 16×16. In this case, the number of pixel data of the 8×8 input feature map 1810 is 64 (=8×8), which has a value larger than 16 that is the number of input values that may be received in the core 1800.

The neural network device may split the input feature map 1810 into sub feature maps 1811 when the number of pixel data in the input feature map 1810 is greater than the number of input values in the core 1800, i.e. the number of columns M. In an example, the neural network device may split the input feature map 1810 into the sub feature maps 1811 based on size information of the core 1800.

In an example, when the size of the input feature map 1810 is 8×8 and the size of the core 1800 is 16×16, the neural network device may split the input feature map 1810 into four sub feature maps such that the number of pixel data of each of the sub feature maps is 16. The neural network device may match the split sub feature maps to separate cores. For example, the neural network device may receive 'aa' of the sub feature map 1810 as a first input value 'V1' of the core 1800 and 'ab' of the sub feature map 1810 as a second input value 'V2' of the core 1800, and 'dd' of the sub feature map 1810 as a sixteenth input value 'V16' of the core 1800.

As described with reference to FIG. 17, the pixel data of the sub feature map 1810 may be digital signals (e.g., 1 bit, 4 bits, etc.) and the neural network device may use a DAC to convert the pixel data to analog signals and then receive a converted value (a voltage V) as an input value of the core 1800.

Figure 19:
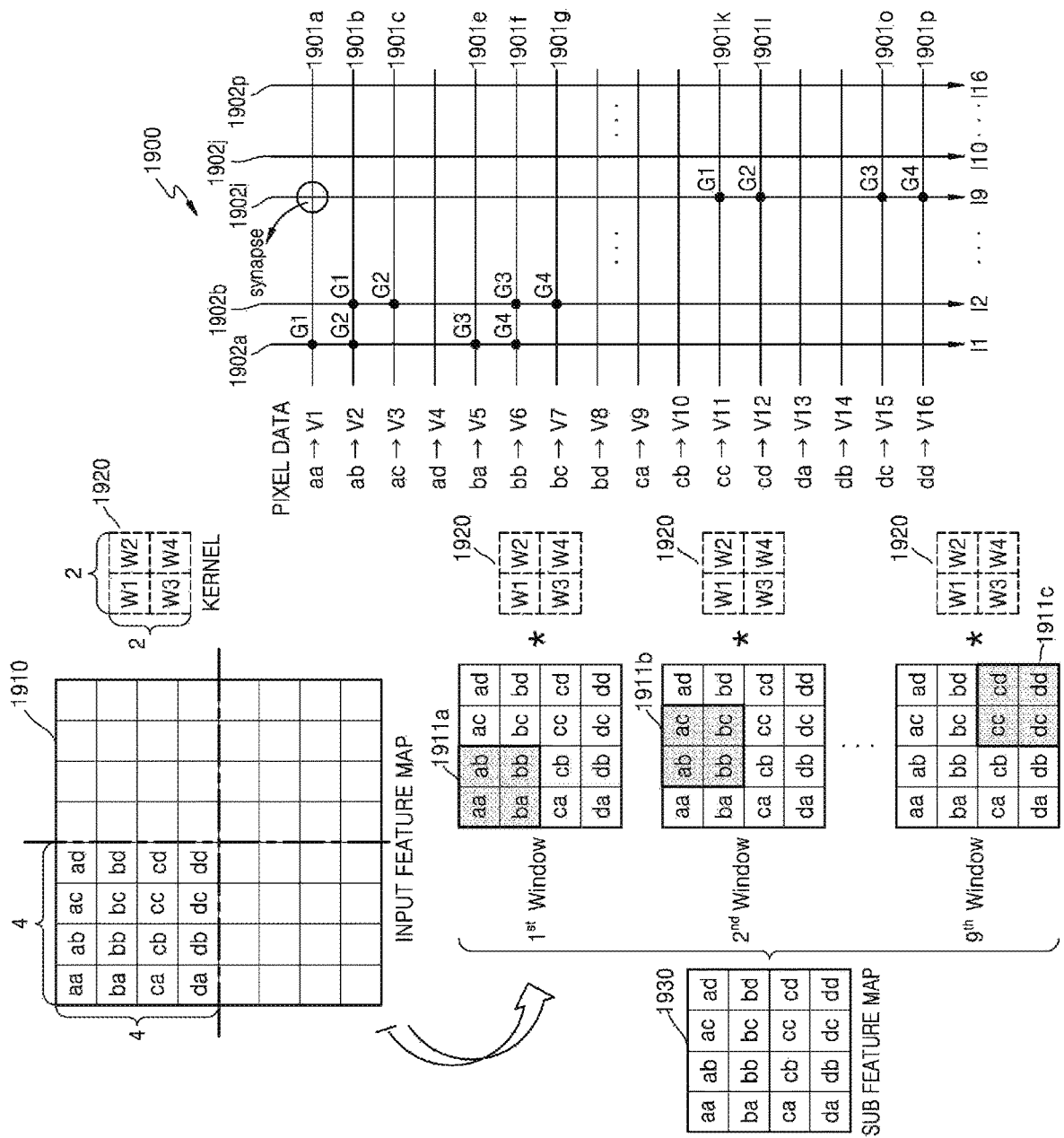
FIG. 19 is a diagram illustrating an example in which a vector multiplication operation is performed in a core.

FIG. 19 is a diagram illustrating an example in which a vector multiplication operation is performed in a core.

Sizes of an input feature map 1910, a kernel 1920, sub feature maps 1930, and a core 1900 shown in FIG. 19 are exemplary and are not limited to the sizes shown in FIG. 19.

Referring to FIG. 19, as in FIG. 18, the size of the input feature map 1910 is 8×8, and the size of the core 1900 is 16×16. Since the number of pixel data of the 8×8 input feature map 1910 is 64 (=8×8), which has a value larger than 16 that is the number of input values that may be received by the core 1900. A neural network device may split the input feature map 1910 into 4 sub feature maps such that the number of pixel data of each of the sub feature maps is 16.

The kernel 1920 having a 2×2 size performs a convolution operation between the kernel 1920 and the input feature map 1910 while sliding in a window (or a tile) unit of a 2×2 pixel size in the input feature map 1910. The convolution operation means an operation of summing all values obtained by multiplying each pixel data of a window of the input feature map 1910 and a weight of each element of the corresponding position in the original kernel 1920 and obtaining each pixel data of an output feature map.

The convolution operation between the sub feature map 1930 and the kernel 1920 is performed even when the input feature map 1910 splits into sub feature maps as shown in FIG. 19. In an example, the kernel 1920 firstly performs the convolution operation with a first window 1911a of the sub feature map 1930. That is, pixel data aa, ab, ba, and bb of the first window 1911a are respectively multiplied by element weights W1, W2, W3, and W4 of the kernel 1920, and multiplication resultant values are all summed, and thus the pixel data of the output feature map is calculated. In a similar manner, the kernel 1920 may perform the convolution operation with a second window 1911b to a ninth window 1911c of the sub feature map 1930. Hereinafter, the element weights W1, W2, W3, and W4 of the kernel 1920 will be referred to as kernel values.

The convolution operation described above may be performed in the core 1900 as follows.

The neural network device may receive 16 pixel data aa, ab, ac, . . . , dd included in the sub feature map 1930 as inputs of the core 1900 having a 16×16 size. The neural network device may use a DAC to convert pixel data in the form of digital signals into voltages V1 to V16 in the form of analog signals, and receive the voltages V1 to V16 as the inputs of the core 1900. In an example, the core 1900 may be desirable in terms of DAC power consumption when receiving pixel data of a 4-bit resolution as an input.

Also, kernel values W1, W2, W3 and W4 may be stored in the core 1900 of the neural network device. In an example, the kernel values W1, W2, W3 and W4 may be completely trained values in the neural network. Specifically, the kernel values W1, W2, W3, and W4 may be stored in a synapse of the core 1900, that is, a memory cell. The kernel values W1, W2, W3 and W4 may be stored in the memory cell as conductance values G1, G2, G3 and G4. Each of the kernel values W1 through W4 corresponds to the conductance values G1 through G4 stored in the memory cell. On the other hand, a conductance value of memory cells in which the conductance values G1, G2, G3 and G4 are not stored in the memory cells of the core 1900 may be '0'.

In an example, the neural network device may initialize kernel values. The initialized kernel values may be stored in the memory cell of the core 1900 as conductance values. An initialization method may include methods, such as, for example, the Gaussian standard normal distribution method, the Xavier initialization method, and the He initialization method.

The neural network device may also divide the initialized kernel values by a square root of the number of split sub feature maps. In an example, when the input feature map 1910 splits into 4 sub feature maps, the neural network device may divide the initialized kernel values by $\sqrt{4}$. The neural network device may store the kernel values on which a division operation has been performed in the memory cell of the core 1900 as conductance values. In an example, the prediction accuracy is improved when the kernel values are initialized using the He initialization method and then a resultant value obtained by dividing the kernel values by a square root of the number of sub feature maps is used as the conductance value of the memory cell.

Hereinafter, for convenience of description, row lines in a horizontal direction will be referred to as a first row line 1901*a* to a 16th row line 1901*p* in order from the top to the bottom, and column lines will be referred to as a first column line 1902*a* to a sixteenth column line 1902*p* in order from the left to the right.

Upon reviewing the first column line 1902*a*, conductance values G1, G2, G3 and G4 are respectively stored in a memory cell intersecting a first row line 1901*a*, a second row line 1901*b*, a fifth row line 1901*e* and a sixth row line 1901*f*. Input voltage values of the core 1900 corresponding to a first row line 1901*a*, a second row line 1901*b*, a fifth row line 1901*e*, and a sixth row line 1901*f* are respectively V1, V2, V5, and V6. Since the Ohm's law is applied between a voltage and a conductance, as a result of a vector multiplication operation between the conductance values G1, G2, G3 and G4 stored in the memory cell and the input voltage values V1, V2, V5, and V6 of the core 1900, a first output value I1 of the core 1900 may be calculated according to Equation 1 below.

$$I_1 = V1 \times G1 + V2 \times G2 + V5 \times G3 + V6 \times G4 \quad \text{[Equation 1]}$$

The kernel values W1 to W4 corresponds t the conductance values G1 to G4 stored in the memory cell respectively. The input values V1, V2, V5 and V6 of the core 1900 correspond to the pixel data aa, ab, ba and bb. That is, the first output value I1 of the core 1900 corresponds to a result of the convolution operation between the kernel 1920 and the first window 1911*a*.

Upon reviewing the second column line 1902*b*, the conductance values G1, G2, G3 and G4 are respectively stored in a memory cell intersecting the second row line 1901*b*, a third row line 1901*c*, the sixth row line 1901*f*, and a seventh row line 1901*e*. In the same manner as when the first output value I1 of the core 1900 is calculated, a second output value I2 of the core 1900 may be calculated according to Equation 2 below. The second output value I2 of the core 1900 corresponds to a result of the convolution operation between the kernel 1920 and the second window 1911*b*.

$$I_2 = V2 \times G1 + V3 \times G2 + V6 \times G3 + V7 \times G4 \quad \text{[Equation 2]}$$

According to the above-mentioned process, the neural network device may calculate the first output value I1 through the sixteenth output value I16 by performing the vector multiplication operation between the input values of the core 1900 and the conductance values stored in the memory cell.

In FIG. 19, since the number of windows 1911*a*, 1911*b*, and 1911*c* on which the vector multiplication operation is performed with the kernel 1920 is 9, the conductance values G1, G2, G3 and G4 may be stored in only the memory cell on the first to ninth column lines 1902*a* to 1902*i*. That is, the conductance values stored in the memory cell on the tenth column line 1902*j* through the sixteenth column line 1902*p* may be all '0'. At this time, a tenth output value I10 through a 16th output value I16 of the core 1900 becomes 0.

Since the output values I1 to I16 calculated in the core 1900 are analog signals, the neural network device may convert the output values I1 to I16 into digital signals using an ADC. Also, the neural network device may calculate an input value of another core by applying an activation function to the digital signal converted by the ADC.

Figure 20:
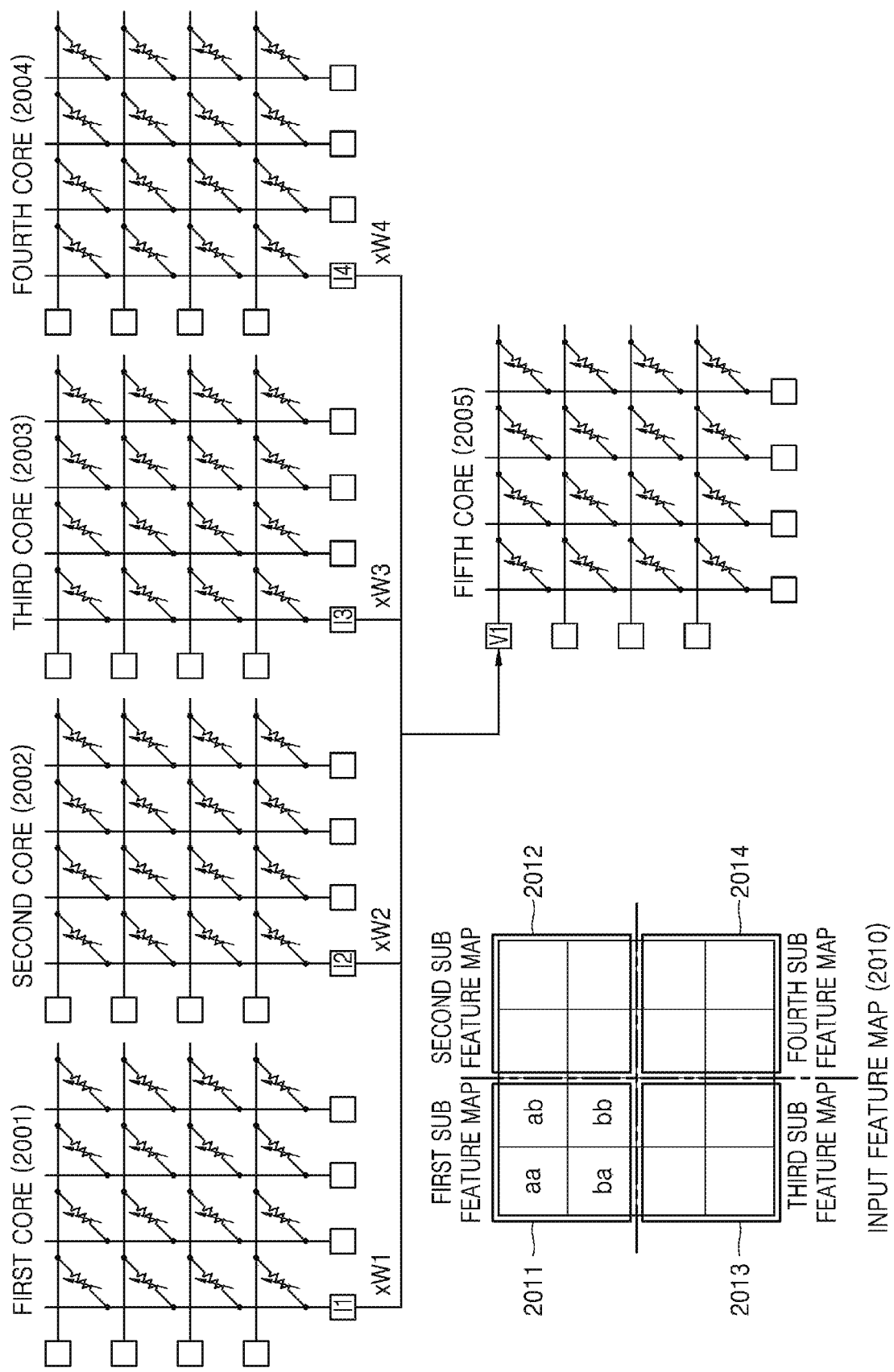
FIG. 20 is a diagram illustrating an example of merging output values calculated in a plurality of cores.

FIG. 20 is a diagram illustrating an example of a method of merging output values calculated in a plurality of cores.

Referring to FIG. 20, the size of an input feature map 2010 is 4×4, and the sizes of first to fifth cores 2001 to 2005 are 4×4. Since the number of pixel data of the 4×4 input feature map 2010 is 16 (=4×4), which has a value larger than 4 that is the number of input values that may be received by the first to fifth cores 2001 to 2005. A neural network device may split the input feature map 2010 into four sub feature maps such that the number of pixel data of each of first and fourth sub feature maps 2011 to 2014 is 4.

Pixel data 'aa, ab, ba, bb' of the first sub feature map 2011 may be received as an input of the first core 2001. The neural network device may use a DAC to convert the pixel data 'aa, ab, ba, bb' in a digital signal form into a voltage in an analog signal form and then receive the voltage as an input of the first core 2001. Similarly, the neural network device may convert pixel data of each of the second to fourth sub feature maps 2012 to 2014 into analog signals and then receive the analog signals as inputs of the second to fourth cores 2002 to 2004.

As described with reference to FIG. 19, initialized kernel values may be stored as conductance values in a memory cell of the first to fifth cores 2001 to 2005. In an example, the He initialization method is used initialize kernel values. The neural network device may initialize the kernel values using the He initialization method and store a resultant value obtained by dividing the kernel values by a square root of the number of sub feature maps as the conductance value of the memory cell.

The neural network device performs a vector multiplication operation between an input voltage value and the conductance value stored in the memory cell of the first to fourth cores 2001 to 2004. As a result of performing the vector multiplication operation, output values of the first to fourth cores 2001 to 2004 are calculated. At this time, since each of the first to fourth cores 2001 to 2004 receives pixel data of the first to fourth sub feature maps 2011 to 2014 as inputs, the neural network device may merge the output values calculated from the first to fourth cores 2001 to 2004. The neural network device may transmit the merged output values as input values of a new core.

In an example, the neural network device may merge output values of column lines having the same order in each core among the output values calculated in the first to fourth cores 2001 to 2004. For example, the neural network device may merge an output value I1 of a first column line of the first core 2001, an output value I2 of a first column line of the second core 2002, an output value I3 of a first column line of the third core 2003, and an output value I4 of a first column line of the fourth core 2004. The neural network device may merge the output values I1 to I4 and then transmit the merged output values as an input value V1 of the fifth core 2005.

Further, the neural network device may multiply the output values I1 to I4 calculated by the first to fourth cores 2001 to 2004 by the weight values W1 to W4, respectively, and then merge output values multiplied by the weight values W1 to W4. That is, the input value V1 of the fifth core 2005 may be calculated according to Equation 3 below.

$$V1 = I1 \times W1 + I2 \times W2 + I3 \times W3 + I4 \times W4 \qquad \text{[Equation 3]}$$

In an example, the weight values W1 to W4 are different from a kernel value, and may be determined through training in a neural network. In an example, the weight values W1 through W4 may be '1', but are not limited thereto.

Similarly, the neural network device may merge remaining output values calculated in the first to fourth cores 2001 to 2004, and then transmit the merged output values as an input value of the fifth core 2005.

On the other hand, since the output values calculated in the first to fourth cores 2001 to 2004 (or result values obtained by multiplying the calculated output values by the weight values W1 to W4) are analog signals (current values), the neural network device may use an ADC to convert the output values into digital signals. Also, the neural network device may apply the ReLU function to the output values converted into the digital signal in the ADC. The neural network device may merge the output values to which the activation function is applied, and then transmit the merged output values as an input value of the fifth core 2005.

As described above, when the number of pixel data in an input feature map is greater than the number of input values in a core, the input feature map may be split into sub feature maps and the split sub feature maps may be matched to separate cores. The neural network device may reduce the consumption of a DAC power, an ADC power and a chip power by splitting the input feature map as described above, and further reduce a chip area.

Figure 21:
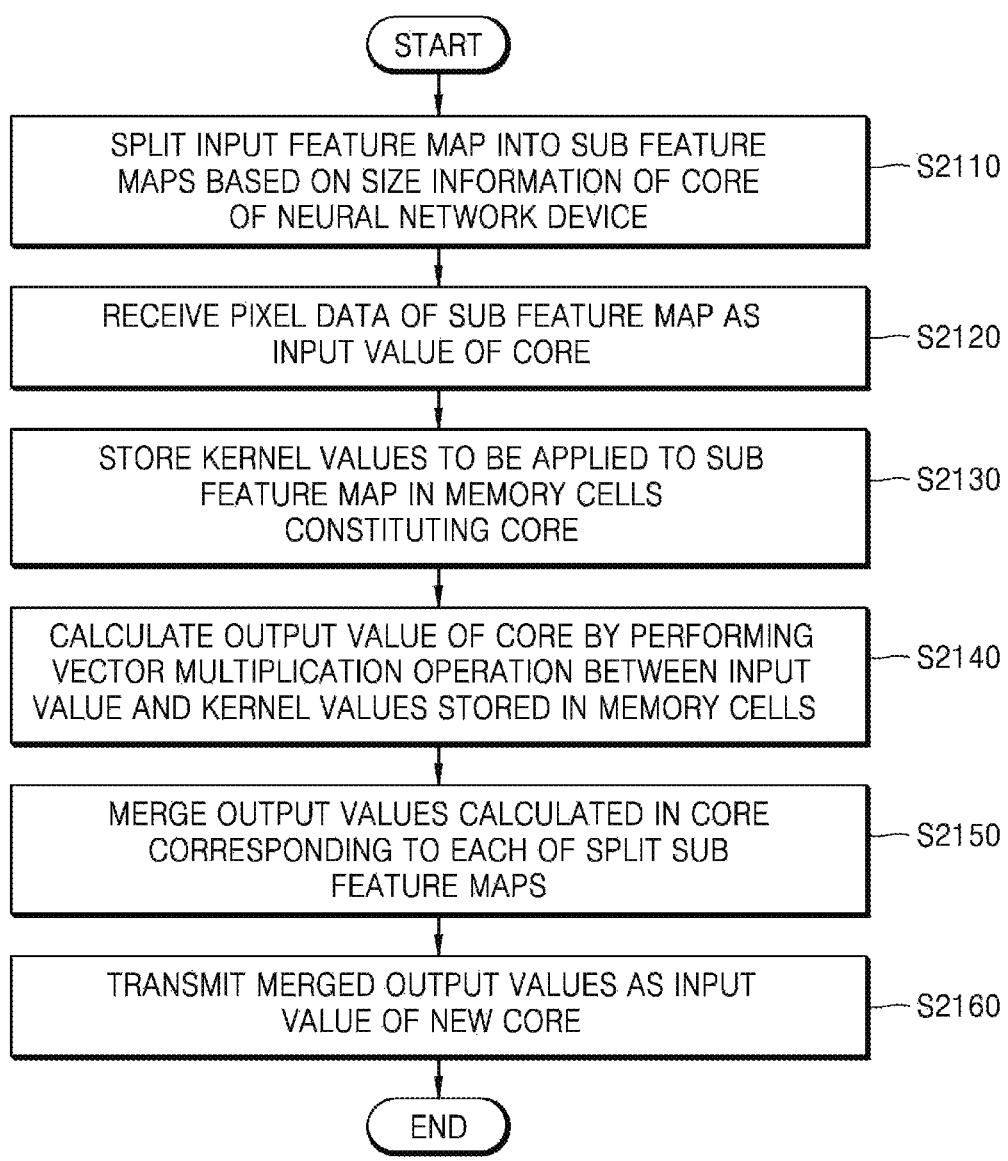
FIG. 21 is a diagram illustrating an example of a method, performed by a neural network device, of implementing a neural network.

FIG. 21 is a diagram illustrating an example of a method performed by a neural network device, of implementing a neural network. The operations in FIG. 21 may be performed in the sequence and manner as shown, although the order of some operations may be changed or some of the operations omitted without departing from the spirit and scope of the illustrative examples described. Many of the operations shown in FIG. 21 may be performed in parallel or concurrently. One or more blocks of FIG. 12, and combinations of the blocks, can be implemented by special purpose hardware-based computer that perform the specified functions, or combinations of special purpose hardware and computer instructions. In addition to the description of FIG. 21 below, the descriptions of FIGS. 1-20 are also applicable to FIG. 21, and are incorporated herein by reference. Thus, the above description may not be repeated here.

Referring to FIG. 21, in operation S2110, the neural network device may split an input feature map into sub feature maps based on size information of a core of the neural network device. The input feature map and the size of the core may be represented by a matrix. In an example, when the number of pixel data constituting the input feature map is greater than the number of input values (the number of columns) of the core, the neural network device may split the input feature map into a plurality of sub feature maps such that the number of pixel data of the split sub feature maps is smaller than or the same as the number of input values of the core.

In operation S2120, the neural network device may receive the pixel data of the sub feature map as an input value of the core.

Since the pixel data of the sub feature map is a digital signal, the neural network device may convert the pixel data into an analog signal (voltage) using a DAC in order to receive the pixel data as the input value of the core. In another example, the pixel data of the sub feature map may be a digital signal of 4 bit resolution.

In operation S2130, the neural network device may store kernel values to be applied to the sub feature map in memory cells constituting the core.

The kernel values may be stored in the memory cells of the core. The kernel values stored in the memory cells may be conductance. The kernel values may be values trained in a separate neural network. The split sub feature map may be used as input data instead of the input feature map in separate neural network training.

In an example, the neural network device initializes the trained kernel values using the He initialization method, and store a resultant value obtained by dividing the kernel values by a square root of the number of the sub feature maps as a conductance value of the memory cell.

In operation S2140, the neural network device may calculate an output value of the core by performing a vector multiplication operation between an input value and the kernel values stored in the memory cells.

Since the Ohm's law is applied between a voltage and a conductance, the neural network device may calculate the output value (a current) of the core by performing the vector multiplication operation between the kernel value (the conductance) stored in the memory cell and the input value (the voltage) of the core.

In operation S2150, the neural network device may merge output values calculated in the core corresponding to each of the split sub feature maps.

The neural network device may merge output values of column lines having the same order in each core among the output values calculated in each of the plurality of cores. Further, the neural network device may multiply each of the output values calculated in each of the plurality of cores by a weight value, and then merge output values multiplied by the weight value. In an example, the weight values W1 to W4 are different from the kernel value.

In operation S2160, the neural network device may transmit the merged output values as an input value of a new core.

Since the output values calculated in the core (or the resultant values obtained by multiplying the calculated output values by the weight values) are analog signals (current), the neural network device may convert the output values into digital signals using an ADC. Also, the neural network device may apply the ReLU function to the output values converted the digital signals in the ADC. The neural network device may merge the output values to which an activation function is applied, and then transmit the merged output values to the input value of the new core.

The neural network device may transmit the merged output values as the input value of the new core, and then perform operations S2120 through S2150.

Figure 22:
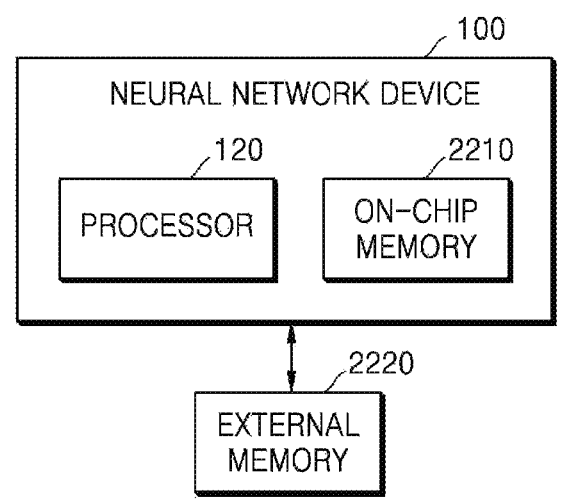
FIG. 22 is a diagram illustrating an example of a neural network device and a memory.

FIG. 22 is a diagram illustrating an example of the neural network device 100 and a memory 2210.

Referring to FIG. 22, the neural network device 100 may include the processor 120 and the on-chip memory 2210. Only components related to the embodiments are shown in the neural network device 100 shown in FIG. 22. The neural network device 100 may further include general components other than the components shown in FIG. 22.

The neural network device 100 may be mounted on a digital system that needs to operate a low power neural network such as, for example, a smart phone, a drone, a tablet device, an augmented reality (AR) device, an Internet of things (IoT) device, an autonomous vehicle, a robotics, a medical device, a security device, and a smart device.

The neural network device 100 may include a plurality of on-chip memories 2210. Each of the plurality of on-chip memories 2210 may include a plurality of cores. Each of the plurality of cores may include a plurality of presynaptic neurons, a plurality of postsynaptic neurons, and a synapse, i.e., a memory cell that provides a connection between each of the plurality of presynaptic neurons and each of the plurality of postsynaptic neurons. In an example, the core may be implemented in an RCA.

An external memory 2220 is hardware for storing various data processed in the neural network device 100 and may store data processed and data to be processed by the neural network device 100. The external memory 2220 may also store applications, drivers, etc., to be driven by the neural network device 100. The external memory 2220 may include random-access memory (RAM), such as dynamic random-access memory (DRAM) and static random-access memory (SRAM), read-only memory (ROM), electrically erasable programmable read-only memory (EEPROM), CD-ROM, blue-rays or other optical disc storages, a hard disk drive (HDD), a solid state drive (SSD), or flash memory. Further description of the external memory 2220 is provided below.

The processor 120 serves to control overall functions for driving the neural network device 100. For example, the processor 120 generally controls the neural network device 100 by executing programs stored in the on-chip memory 2210 within the neural network device 100. The processor 120 may be implemented in a central processing unit (CPU), a graphics processing unit (GPU), an application processor (AP), or the like, which are provided in the neural network device 100, but is not limited thereto. The processor 120 reads/writes various data from/to the external memory 2220 and executes the neural network device 100 using the read/write data. Further description of the processor 120 is provided below.

The processor 120 may split an input feature map into sub feature maps based on size information of the core and may receive pixel data of the split sub feature maps as an input value of the core. The processor 120 may convert the pixel data into an analog signal (voltage) using a DAC.

The processor 120 may store kernel values to be applied to a sub feature map in memory cells constituting the core. The kernel values may be stored in the memory cell of the core. The kernel values stored in the memory cell may be a conductance. Also, the processor 120 may calculate output value of the core by performing a vector multiplication operation between an input value and the kernel values stored in the memory cells.

The processor 120 may merge the output values calculated in the core corresponding to each of the split sub feature maps. Specifically, the neural network device may multiply each of the output values calculated in each of the plurality of cores by a weight value, and then merge the output values multiplied by the weight value. On the other hand, since the output values calculated in the core (or resultant values obtained by multiplying the calculated output values by the weight value) are analog signals (current), the processor 120 may use an ADC to convert the output values into a digital signal. Also, the processor 120 may apply the ReLU function to the output values converted to the digital signal in the ADC.

The processor 120 may merge the output values to which an activation function is applied, and then transmit the merged output values as an input value of a new core.

The neural network device 100 and other apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 11-14 and 21 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the method of preventing the collision. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A neural network device comprising:
   input image data comprising a first input and a second input;
   a processor; and
   a memory storing processor-readable instructions that, when executed by the processor, configure the processor to
   generate, from the input image data, a plurality of data streams having different delay times and representing image data from input terminals,
   control the processor to arrange the plurality of data streams based on the different delay times, including a control of the processor to determine the first input and the second input by selecting portions of feature map data extracted at a same cycle from the arranged plurality of data streams,
   generate a first result by applying the first input to a plurality of kernels,
   generate a second result by applying the second input, which is received at a time delayed by a first interval from a time when the first input is received, to the plurality of kernels, and
   perform an inference operation including at least one of an image recognition, an image verification, and an image classification associated with the input image data, using output data generated based on the first result and the second result, wherein the neural network device comprises neuromorphic hardware configured to perform convolution neural network (CNN).

2. The neural network device of claim 1,
   wherein the neuromorphic hardware performs the convolution neural network (CNN) mapping using the first input and the second input.

3. The neural network device of claim 1, further comprising the memory storing the processor-readable instructions that, when executed by the processor, cause the processor to drive a neural network by executing the processor-readable instructions and performing an operation on the input image data.

4. The neural network device of claim 1,
wherein the first input comprises data with respect to a first region of the input image data and the second input comprises data with respect to a second region of the input image data.

5. The neural network device of claim 4, wherein the first region and the second region partially overlap and are adjacent to each other.

6. The neural network device of claim 5, wherein the processor is further configured to generate the second result by performing operations between the second input and the plurality of kernels, in response to the second input being a valid input.

7. The neural network device of claim 6, wherein the processor is further configured to determine that the second input is the valid input, in response to the second input being pixel data constituting the second region.

8. The neural network device of claim 1,
wherein the first input is received during a first cycle, and
wherein the second input is received during a second cycle delayed by the first interval from the first cycle.

9. The neural network device of claim 1, wherein the processor is further configured to generate the first result by adding operation results between the first input and the plurality of kernels, and to generate the second result by adding operation results between the second input and the plurality of kernels.

10. The neural network device of claim 1, wherein the processor is further configured to receive a third input included in the input image data at a time delayed by a second interval from a time when the second input is received, to obtain a third result by performing operations between the third input and the plurality of kernels, and to obtain the output data by using the first result, the second result, and the third result.

11. A processor-implemented method, performed by a processor of a neural network device, of performing an operation on input image data comprising a first input and a second input, the method comprising:
generating, from the input image data, a plurality of data streams having different delay times and representing image data from input terminals,
controlling the processor to arrange the plurality of data streams based on the different delay times, including controlling of the processor to determine the first input and the second input by selecting portions of feature map data extracted at a same cycle from the arranged plurality of data streams,
generating a first result by applying the first input to a plurality of kernels using the processor in the neural network device;
generating a second result by applying the second input received at a time delayed by a first interval from a time when the first input is received to the plurality of kernels using the processor; and
performing an inference operation including at least one of an image recognition, an image verification, and an image classification associated with the input image data, using output data generated based on the first result and the second result, wherein the neural network device comprises neuromorphic hardware configured to perform convolution neural network (CNN).

12. The method of claim 11,
wherein the neuromorphic hardware performs the convolution neural network (CNN) mapping using the first input and the second input.

13. The method of claim 11,
wherein the first input comprises data with respect to a first region of the input image data and the second input comprises data with respect to a second region of the input image data.

14. The method of claim 13, wherein the first region and the second region partially overlap and are adjacent to each other.

15. The method of claim 14, wherein the generating of the second result comprises:
generating the second result by performing operations between the second input and the plurality of kernels, in response to determining that the second input is a valid input.

16. The method of claim 15, wherein the determining of whether the second input is the valid input comprises:
determining that the second input is the valid input, in response to the second input being pixel data constituting the second region.

17. The method of claim 11,
wherein the first input is received during a first cycle, and
wherein the second input is received during a second cycle delayed by the first interval from the first cycle.

18. The method of claim 11,
wherein the generating of the first result comprises generating the first result by adding operation results between the first input and the plurality of kernels, and
wherein the generating of the second result comprises generating the second result by adding operation results between the second input and the plurality of kernels.

19. The method of claim 11, further comprising:
receiving a third input included in the input data at a time delayed by a second interval from a time when the second input is received by using the processor; and
generating a third result by performing operations between the third input and the plurality of kernels,
wherein the generating of the output data comprises generating the output data using the first result, the second result, and the third result.

20. A non-transitory computer-readable recording medium storing instructions that, when executed by the processor, cause the processor to perform the method of claim 11.

* * * * *